(12) United States Patent
Kissell et al.

(10) Patent No.: US 7,281,123 B2
(45) Date of Patent: Oct. 9, 2007

(54) RESTORING REGISTER VALUES FROM STACK MEMORY USING INSTRUCTION WITH RESTORE INDICATION BIT AND DE-ALLOCATION FRAME SIZE STACK POINTER OFFSET

(75) Inventors: Kevin D. Kissell, Le Bar sur Loup (FR); Hartvig W. J. Ekner, Ballerup (DK)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 10/994,827

(22) Filed: Nov. 23, 2004

(65) Prior Publication Data

US 2005/0081022 A1 Apr. 14, 2005

Related U.S. Application Data

(62) Division of application No. 09/882,285, filed on Jun. 18, 2001, now Pat. No. 6,826,681.

(51) Int. Cl.
G06F 9/40 (2006.01)
(52) U.S. Cl. .................. 712/228; 712/229; 718/108
(58) Field of Classification Search ............ None
See application file for complete search history.

(56) References Cited

U.S. PATENT DOCUMENTS

| | | | |
|---|---|---|---|
| 3,631,405 A | 12/1971 | Hoff et al. ............ 712/209 |
| 3,794,980 A | 2/1974 | Cogar et al. .......... 712/242 |
| 3,811,114 A | 5/1974 | Lemay et al. ......... 712/208 |
| 3,840,861 A | 10/1974 | Amdahl et al. ........ 713/501 |
| 3,983,541 A | 9/1976 | Faber et al. .......... 712/247 |
| 4,110,822 A | 8/1978 | Porter et al. .......... 712/207 |
| 4,149,244 A | 4/1979 | Anderson et al. ...... 712/31 |
| 4,229,790 A | 10/1980 | Gilliland et al. ....... 718/101 |
| 4,295,193 A | 10/1981 | Pomerene ............. 712/215 |
| 4,338,663 A | 7/1982 | Strecker et al. ....... 712/228 |
| 4,432,056 A | 2/1984 | Aimura ................ 712/245 |
| 4,467,409 A | 8/1984 | Potash et al. ......... 712/16 |

(Continued)

FOREIGN PATENT DOCUMENTS

EP 0 073 424 A2 3/1983

(Continued)

OTHER PUBLICATIONS

*ARM Architecture Reference Manual*, Advanced RISC Machines Ltd., Prentice Hall, pp. 3-41, 3-42, 3-43, 3-67 and 3-68 (1996).

(Continued)

*Primary Examiner*—Kenneth S. Kim
(74) *Attorney, Agent, or Firm*—Sterne, Kessler, Goldstein & Fox P.L.L.C.

(57) ABSTRACT

Provided is a method and system for encoding an instruction to restore processor core register values. The method includes encoding in a first field of the instruction whether a first value, in a stack memory location having an address value equal to A plus a second value in a second register, is to be restored to a first register. A third value is encoded in a second field of the instruction for adjusting the second value in the second register.

22 Claims, 22 Drawing Sheets

U.S. PATENT DOCUMENTS

| | | | |
|---|---|---|---|
| 4,507,728 A | 3/1985 | Sakamoto et al. | 712/1 |
| 4,524,416 A * | 6/1985 | Stanley et al. | 711/200 |
| 4,685,080 A | 8/1987 | Rhodes, Jr. et al. | 712/248 |
| 4,724,517 A | 2/1988 | May | 712/210 |
| 4,777,594 A | 10/1988 | Jones et al. | 712/240 |
| 4,782,441 A | 11/1988 | Inagami et al. | 712/9 |
| 4,833,640 A | 5/1989 | Baba | 718/108 |
| 4,876,639 A | 10/1989 | Mensch, Jr. | 703/27 |
| 5,031,096 A | 7/1991 | Jen et al. | 711/169 |
| 5,109,495 A | 4/1992 | Fite et al. | 712/207 |
| 5,132,898 A | 7/1992 | Sakamura et al. | 712/210 |
| 5,241,636 A | 8/1993 | Kohn | 712/215 |
| 5,241,679 A | 8/1993 | Nakagawa et al. | 710/260 |
| 5,327,566 A | 7/1994 | Forsyth | 710/260 |
| 5,355,460 A | 10/1994 | Eickemeyer et al. | 712/215 |
| 5,414,864 A * | 5/1995 | Koizumi | 712/228 |
| 5,442,761 A | 8/1995 | Toda et al. | 712/205 |
| 5,493,687 A | 2/1996 | Garg et al. | 712/23 |
| 5,506,974 A | 4/1996 | Church et al. | 712/202 |
| 5,517,664 A | 5/1996 | Watanabe et al. | 712/41 |
| 5,524,211 A | 6/1996 | Woods et al. | 709/220 |
| 5,542,060 A | 7/1996 | Yoshida | 712/208 |
| 5,574,873 A | 11/1996 | Davidian | 712/200 |
| 5,574,928 A | 11/1996 | White et al. | 712/23 |
| 5,732,234 A | 3/1998 | Vassiliadis et al. | 712/200 |
| 5,740,461 A | 4/1998 | Jaggar | 712/41 |
| 5,859,999 A * | 1/1999 | Morris et al. | 712/224 |
| 6,021,265 A | 2/2000 | Nevill | 712/209 |
| 6,128,728 A * | 10/2000 | Dowling | 712/228 |
| 6,212,630 B1 | 4/2001 | Takayama et al. | 712/242 |
| 6,266,765 B1 | 7/2001 | Horst | 712/215 |
| 6,272,620 B1 | 8/2001 | Kawasaki et al. | 712/41 |
| 6,631,460 B1 * | 10/2003 | Morris et al. | 712/217 |
| 6,826,681 B2 | 11/2004 | Kissell et al. | 712/228 |
| 2001/0021970 A1 | 9/2001 | Hotta et al. | 712/206 |
| 2002/0099872 A1 * | 7/2002 | Ramasamy et al. | 710/1 |
| 2002/0138715 A1 | 9/2002 | Minematsu | 712/225 |
| 2004/0054872 A1 | 3/2004 | Nguyen et al. | 712/206 |

FOREIGN PATENT DOCUMENTS

| | | |
|---|---|---|
| EP | 0 239 081 B1 | 9/1995 |
| EP | 0 449 661 B1 | 11/1995 |
| EP | 0 324 308 B1 | 3/1996 |
| EP | 0 368 332 B1 | 9/1997 |
| GB | 2 016 755 A | 9/1979 |

OTHER PUBLICATIONS

Diefendorff, Keith, et al., "Organization of the Motorola 88110 Superscalar RISC Microprocessor", *IEEE Micro*, 12:2, pp. 40-63 (Apr. 1992).

Diefendorff, Keith, et al., "AltiVec Extension to PowerPC Accelerates Media Processing," *IEEE Micro*, 20:2, pp. 85-95 (Mar.-Apr. 2000).

*ESA/390 Principles of Operation*, IBM Library Server, Table of Contents and Paragraphs 7.5.31 and 7.5.70, 23 pages, at web site publibz.boulder.ibm.com/cgi-bin/bookmgr_OS390/BOOK/DZ9AR001/CCONTENTS (1993).

Kane, Gerry, *PA-RISC 2.0 Architecture*, Prentice Hall PTR, Upper Saddle River, New Jersey, pp. 7-106 and 7-107 (1996).

May, Cathy, et al., eds., *The PowerPC™ Architecture: A Specification for a New Family of RISC Processors*, Second Edition, Morgan Kaufmann Publishers, Inc., San Francisco, California, pp. 70-72 (May 1994).

*MC68020 32-Bit Microprocessor User's Manual*, Third Edition, Prentice Hall, Englewood Cliffs, New Jersey, pp. 3-125, 3-126, and 3-127 (1989).

*MC88110 Second Generation RISC Microprocessor User's Manual*, Motorola, Inc., pp. 10-66, 10-67, and 10-71 (1991).

*LSI TinyRisc Development* (visited Apr. 24, 2001) <web site.redhat.com/support/manuals/gnupro99r1/6_embed/emb09.html>, 13 pages.

*VAX11/780 Architecture Handbook*, vol. 1, Digital Equipment Corporation, 1979, pp. 8-20 through 8-23.

Hunter, Colin, "Series 32000 Programmer's Reference Manual," Prentice-Hall, Inc., Englewood Cliffs, New Jersey, 1987, pp. 6-81 through 6-86; pp. 6-164 through 6-167; and pp. 6-183 through 6-184.

*ARM Architecture Reference Manual*, Document No. ARM DDI 0100B, Prentice Hall, New York, New York, 1996, pp. 6-62 through 6-65.

*CompactRISC™ CR16B Programmer's Reference Manual*, National Semiconductor Corporation, Santa Clara, CA, Sep. 1999, pp. Instruction Set 5-44 through Instruction Set 5-47.

Nemirovsky, Mario et al., U.S. Appl. No. 09/629,805, entitled "Method and Apparatus for Improved Computer Load and Store Operations." filed Jul. 31, 2000.

Case, B., "ARM Architecture Offers High Code Density," *Microprocessor Report*, vol. 5, No. 23, pp. 1 and 11-14, (Dec. 18, 1991).

Cobb, P., "TinyRISC: a MIPS-16 embedded CPU core," Presentation for Microprocessor Forum, 13 slides (7 pages), (Oct. 22-23, 1996).

Gwennap, L., "VLIW: The Wave of the Future?", *Microprocessor Report*, vol. 8, No. 2, pp. 1-2 and 18-21, (Feb. 14, 1994).

Kurosawa, K. et al., "Instruction Architecture for a High Performance Integrated Prolog Processor IPP," *Logic Programming: Proceedings of the Fifth International Conference and Symposium*, vol. 2, Massachusetts Institute of Technology, pp. 1506-1530, (1988).

*NEC Data Sheet: MOS Integrated Circuit µPD30121, $V_R4121$ 64-/32-Bit Microprocessor*, NEC Electronics Corporation & MIPS Technologies, Inc., 76 pages, (Copyright 1997, 2000; Published Aug. 2004).

Ross, R., "There's no risk in the future for RISC," *Computer Design*, pp. 73-75, (Nov. 13, 1989).

*User's Manual: $V_R4121$™ 64/32-Bit Microprocessor*, NEC Corporation & MIPS Technologies, Inc., pp. 1-19 and 103-131, (Copyright 1997, 1998; Published Jul. 2000).

*User's Manual: $V_R$ 4100 Series™ 64-/32-Bit Microprocessor Architecture*, NEC Corporation & MIPS Technologies, Inc., pp. 1-16 and 54-83, (Copyright 1997, 2001, 2002; Published Jun. 2002).

Nevill, E., U.S. Re-issue Appl. No. 10/066,475, filed Feb. 1, 2002, entitled "Interoperability with Multiple Instruction Sets," (Available on PAIR).

* cited by examiner

650

SAVE INSTRUCTION

```
temp ← GPR[29]
if ra = 1 then
        temp ← temp - 4
        VirtualMemory[temp] ← GPR[31]
endif
if s1 = 1 then
        temp ← temp - 4
        VirtualMemory[temp] ← GPR[17]
endif
if s0 = 1 then
        temp ← temp - 4
        VirtualMemory[temp] ← GPR[16]
endif
if framesize = 0 then
        temp ← GPR[29] - 128
else
        temp ← GPR[29] - (0 || (framesize << 3))
endif
GPR[29] ← temp
```

FIG.6

| aregs ENCODING (BINARY) | REGISTERS SAVED AS ARGUMENTS | REGISTERS RESTORED AS STATICREGISTERS |
|---|---|---|
| 0000 | NONE | NONE |
| 0001 | NONE | GPR[7] |
| 0010 | NONE | GPR[6], GPR[7] |
| 0011 | NONE | GPR[5], GPR[6], GPR[7] |
| 1011 | NONE | GPR[4], GPR[5], GPR[6], GPR[7] |
| 0100 | a0 | NONE |
| 0101 | a0 | GPR[7] |
| 0110 | a0 | GPR[6], GPR[7] |
| 0111 | a0 | GPR[5], GPR[6], GPR[7] |
| 1000 | a0, a1 | NONE |
| 1001 | a0, a1 | GPR[7] |
| 1010 | a0, a1 | GPR[6], GPR[7] |
| 1100 | a0, a1, a2 | NONE |
| 1101 | a0, a1, a2 | GPR[7] |
| 1110 | a0, a1, a2, a3 | NONE |
| 1111 | RESERVED | RESERVED |

| EXTENDED SAVE INSTRUCTION |
|---|

```
temp ← GPR[29]
temp2 ← GPR[29]
case aregs of
    2#0000 2#0001 2#0010 2#0011 2#1011: args ← 0
    2#0100 2#0101 2#0110 2#0111: args ← 1
    2#1000 2#1001 2#1010: args ← 2
    2#1100 2#1101: args ← 3
    2#1110: args ← 4
    otherwise: UNPREDICTABLE
endcase
if args > 0 then
    VirtualMemory [temp] ← GPR[4]
    if args > 1 then
        VirtualMemory[temp + 4] ← GPR[5]
        if args > 2 then
            VirtualMemory [temp + 8] ← GPR[6]
            if args > 3 then
                VirtualMemory [temp + 12] ← GPR[7]
            endif
        endif
    endif
endif
if ra = 1 then
    temp ← temp - 4
    VirtualMemory[temp] ← GPR[31]
endif
if xsregs > 0 then
    if xsregs > 1 then
        if xsregs > 2 then
            if xsregs > 3 then
                if xsregs > 4 then
                    if xsregs > 5 then
                        if xsregs > 6 then
                            temp ← temp - 4
                            VirtualMemory[temp] ← GPR[30]
                        endif
                        temp ← temp - 4
                        VirtualMemory[temp] ← GPR[23]
                    endif
                    temp ← temp - 4
                    VirtualMemory[temp] ← GPR[22]
                endif
                temp ← temp - 4
                VirtualMemory[temp] ← GPR[21]
            endif
```

FIG.8A

EXTENDED SAVE INSTRUCTION

```
            temp ← temp - 4
            VirtualMemory[temp] ← GPR[20]
        endif
        temp ← temp - 4
        VirtualMemory[temp] ← GPR[19]
    endif
    temp ← temp - 4
    VirtualMemory[temp] ← GPR[18]
endif
if s1 = 1 then
    temp ← temp - 4
    VirtualMemory[temp] ← GPR[17]
endif
if s0 = 1 then
    temp ← temp - 4
    VirtualMemory[temp] ← GPR[16]
endif
case aregs of
    2#0000 2#0100 2#1000 2#1100 2#1110: astatic ← 0
    2#0001 2#0101 2#1001 2#1101: astatic ← 1
    2#0010 2#0110 2#1010: astatic ← 2
    2#0011 2#0111: astatic ← 3
    2#1011: astatic ← 4
    otherwise: UNPREDICTABLE
endcase
if astatic > 0 then
    temp ← temp - 4
    VirtualMemory[temp] ← GPR[7]
    if astatic > 1 then
        temp ← temp - 4
        VirtualMemory[temp] ← GPR[6]
        if astatic > 2 then
            temp ← temp - 4
            VirtualMemory[temp] ← GPR[5]
            if astatic > 3 then
                temp ← temp - 4
                VirtualMemory[temp] ← GPR[4]
            endif
        endif
    endif
endif
temp ← temp2 - (0 || (framesize << 3))
GPR[29] ← temp
```

RESTORE INSTRUCTION

```
if framesize = 0 then
     temp ← GPR[29] + 128
else
     temp ← GPR[29] + (0 ∥ (framesize << 3))
endif
temp2 ← temp
if ra = 1 then
     temp ← temp - 4
     GPR[31] ← VirtualMemory[temp]
endif
if s1 = 1 then
     temp ← temp - 4
     GPR[17] ← VirtualMemory[temp]
endif
if s0 = 1 then
     temp ← temp - 4
     GPR[16] ← VirtualMemory[temp]
endif
GPR[29] ← temp2
```

| EXTENDED RESTORE INSTRUCTION |
|---|
| temp ← GPR[29] + (0 ‖ (FRAMESIZE << 3))<br>temp2 ← temp<br>if ra = 1 then<br>    temp ← temp − 4<br>    GPR[31] ← VirtualMemory[temp]<br>endif<br>if xsregs > 0 then<br>    if xsregs > 1 then<br>        if xsregs > 2 then<br>            if xsregs > 3 then<br>                if xsregs > 4 then<br>                    if xsregs > 5 then<br>                        if xsregs > 6 then<br>                            temp ← temp − 4<br>                            GPR[30] ← VirtualMemory[temp]<br>                      endif<br>                    temp ← temp − 4<br>                    GPR[23] ← VirtualMemory[temp]<br>                endif<br>                temp ← temp − 4<br>                GPR[22] ← VirtualMemory[temp]<br>            endif<br>            temp ← temp − 4<br>            GPR[21] ← VirtualMemory[temp]<br>        endif<br>        temp ← temp − 4<br>        GPR[20] ← VirtualMemory[temp]<br>    endif<br>    temp ← temp − 4<br>    GPR[19] ← VirtualMemory[temp]<br>endif<br>temp ← temp − 4<br>    GPR[18] ← VirtualMemory[temp]<br>endif |

FIG.12A

EXTENDED RESTORE INSTRUCTION

```
if s1 = 1 then
    temp ← temp - 4
    GPR[17] ← VirtualMemory[temp]
endif
if s0 = 1 then
    temp ← temp - 4
    GPR[16] ← VirtualMemory[temp]
endif
case aregs of
    2#0000 2#0100 2#1000 2#1100 2#1110: astatic ← 0
    2#0001 2#0101 2#1001 2#1101: astatic ← 1
    2#0010 2#0110 2#1010: astatic ← 2
    2#0011 2#0111: astatic ← 3
    2#1011: astatic ← 4
    otherwise: UNPREDICTABLE
endcase
if astatic > 0 then
    temp ← temp - 4
    GPR[7] ← VirtualMemory[temp]
    if astatic > 1 then
        temp ← temp - 4
        GPR[6] ← VirtualMemory[temp]
        if astatic > 2 then
            temp ← temp - 4
            GPR[5] ← VirtualMemory[temp]
            if astatic > 3 then
                temp ← temp - 4
                GPR[4] ← VirtualMemory[temp]
            endif
        endif
    endif
endif
GPR[29] ← temp2
```

FIG.12B

RESTORING REGISTER VALUES FROM STACK MEMORY USING INSTRUCTION WITH RESTORE INDICATION BIT AND DE-ALLOCATION FRAME SIZE STACK POINTER OFFSET

CROSS REFERENCE TO RELATED APPLICATION

This application is a division of U.S. patent application Ser. No. 09/882,285, filed Jun. 18, 2001 (to issue as U.S. Pat. No. 6,826,681 on Nov. 30, 2004), and this application contains subject matter related to commonly owned U.S. patent application Ser. No. 09/836,541, filed Apr. 18, 2001, each of which is herein incorporated by reference in its entirety.

BACKGROUND OF THE INVENTION

1. Field of the Invention

The invention relates generally to a data processing system. More particularly, it relates to saving and restoring processor register values and allocating and deallocating stack memory.

2. Background Art

Two well-known operations performed by computer systems are the storing and retrieving of items on a stack. Stackable items include general purpose register contents; e.g., data and addresses. These operations (also referred to as "push" and "pop" operations) are typically used to facilitate the entry to and exit from subroutines. That portion of a stack created for a particular subroutine is referred to as a "stack frame." In programmable devices (such as microprocessors), dedicated instructions may be used to carry out these operations.

It is desired to enhance the utility of stack storing and/or retrieving operations by providing additional functionality associated therewith. Such functionality, when added to instructions for carrying out stack operations, make it possible to write more compact application programs since such instructions encode multiple functions.

BRIEF SUMMARY OF THE INVENTION

The present invention provides methods and means for saving and restoring processor registers and allocating and deallocating a stack frame. In one embodiment, a first field of a save instruction encodes whether a value in a register of a processor is saved as an argument value or a static value. A second field of the save instruction encodes a size of a stack frame created during execution of the save instruction. An argument value is saved in a calling program's stack frame. A static value is saved in a called program's stack frame. A restore instruction is used to restore a static value and deallocate the stack frame. The save and restore instructions may be executed using any programmable device, including a single instruction set architecture processor or a multi-instruction set architecture processor. The functionality of such instructions may be achieved through software, hardware or a combination of both.

In another embodiment, a 16-bit instruction according to the invention comprises at least five fields. These five fields are an instruction opcode field, a 1-bit return address register field, a 1-bit first static register field, a 1-bit second static register field, and a 4-bit frame-size field. This instruction can be executed as a single 16-bit instruction or executed in combination with a 16-bit instruction extension. An instruction extension comprises at least four fields. These four fields are an extend instruction opcode field, a 3-bit additional static registers field, a second 4-bit frame-size field, and a 4-bit arguments register field. The 3-bit additional static registers field allows the values in up to seven addition registers to be saved and restored as static values.

Features of the invention allow the invention to be implemented, for example, as a method for encoding an instruction, as a processor core, as a mapper, as a decoder, and/or as a computer program.

Further features and advantages of the present invention, as well as the structure and operation of various embodiments of the present invention, are described in detail below with reference to the accompanying drawings.

BRIEF DESCRIPTION OF THE DRAWINGS/FIGURES

The features and advantages of the present invention will become more apparent from the detailed description set forth below when taken in conjunction with the drawings in which like reference numbers indicate identical or functionally similar elements.

FIG. 6 illustrates an example computer program pseudo-code for a save instruction according to the invention.

FIG. 7 illustrates an example encoding of an argument registers field of an instruction according to the invention.

FIGS. 8A-8B illustrate an example computer program pseudo-code for an extended save instruction according to the invention.

Figure 10A:
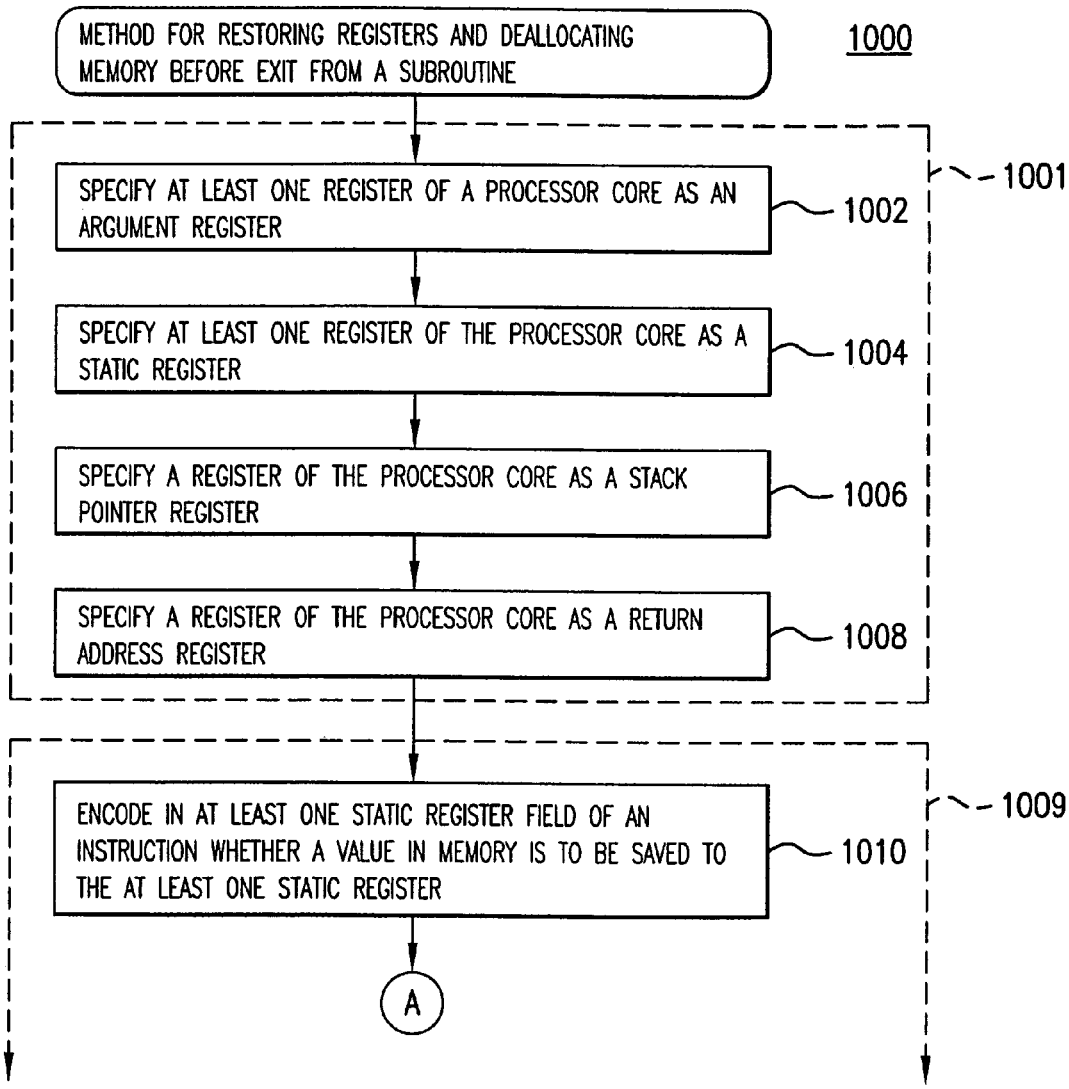
Figure 10B:
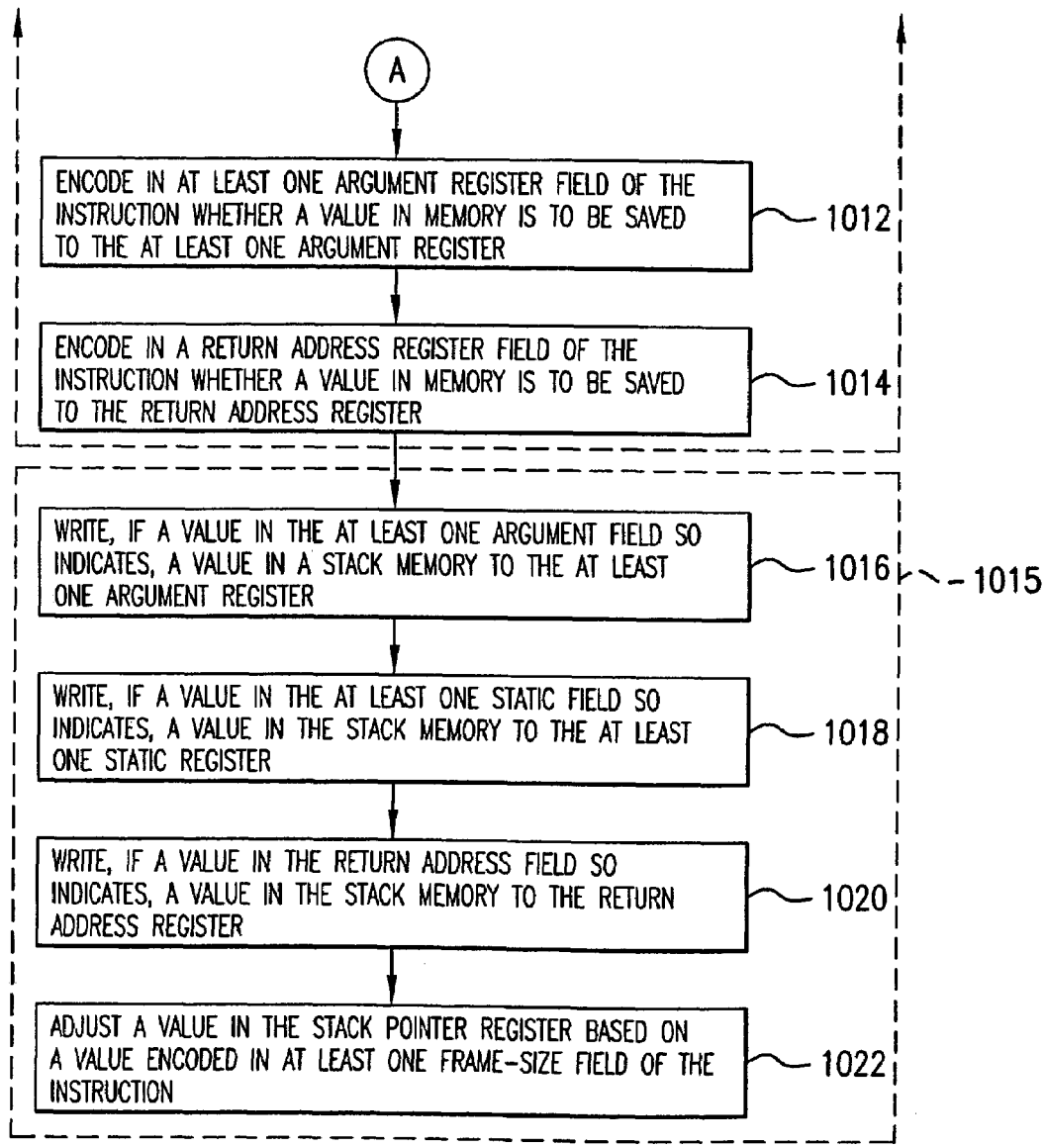

FIGS. 10A-B illustrate a flowchart of a method for restoring registers and deallocating memory before exit from a subroutine according to an embodiment of the invention.

FIG. 11 illustrates an example computer program pseudo-code for a restore instruction according to the invention.

FIGS. 12A-12B illustrate an example computer program pseudo-code for an extended restore instruction according to the invention.

FIGS. 13, 14, 15, 16, 17, and 18 illustrate the operation of example save and restore instructions encoded according to embodiments of the invention.

DETAILED DESCRIPTION OF THE INVENTION

The present invention provides methods and means for saving and restoring a processor register value and allocating and deallocating stack memory. Method embodiments of the invention are encoded in instructions that can be efficiently stored as a part of a computer program. Apparatus embodiments of the invention execute instructions according to the invention.

As described herein, instructions according to the invention can be executed using either a single instruction set architecture processor or a multi-instruction set architecture processor.

In an embodiment of the invention, a first field of a save instruction encodes whether a value in a register of a processor is saved as an argument value or a static value. A second field of the save instruction encodes a size of a stack frame created during execution of the save instruction. An argument value is saved in a calling program's stack frame. A static value is saved in a called program's stack frame. A restore instruction is used to restore a static value and deallocate the stack frame.

The invention is now described with reference to FIGS. 1-18.

EXAMPLE APPARATUS/SYSTEM EMBODIMENTS OF THE INVENTION

Figure 1:
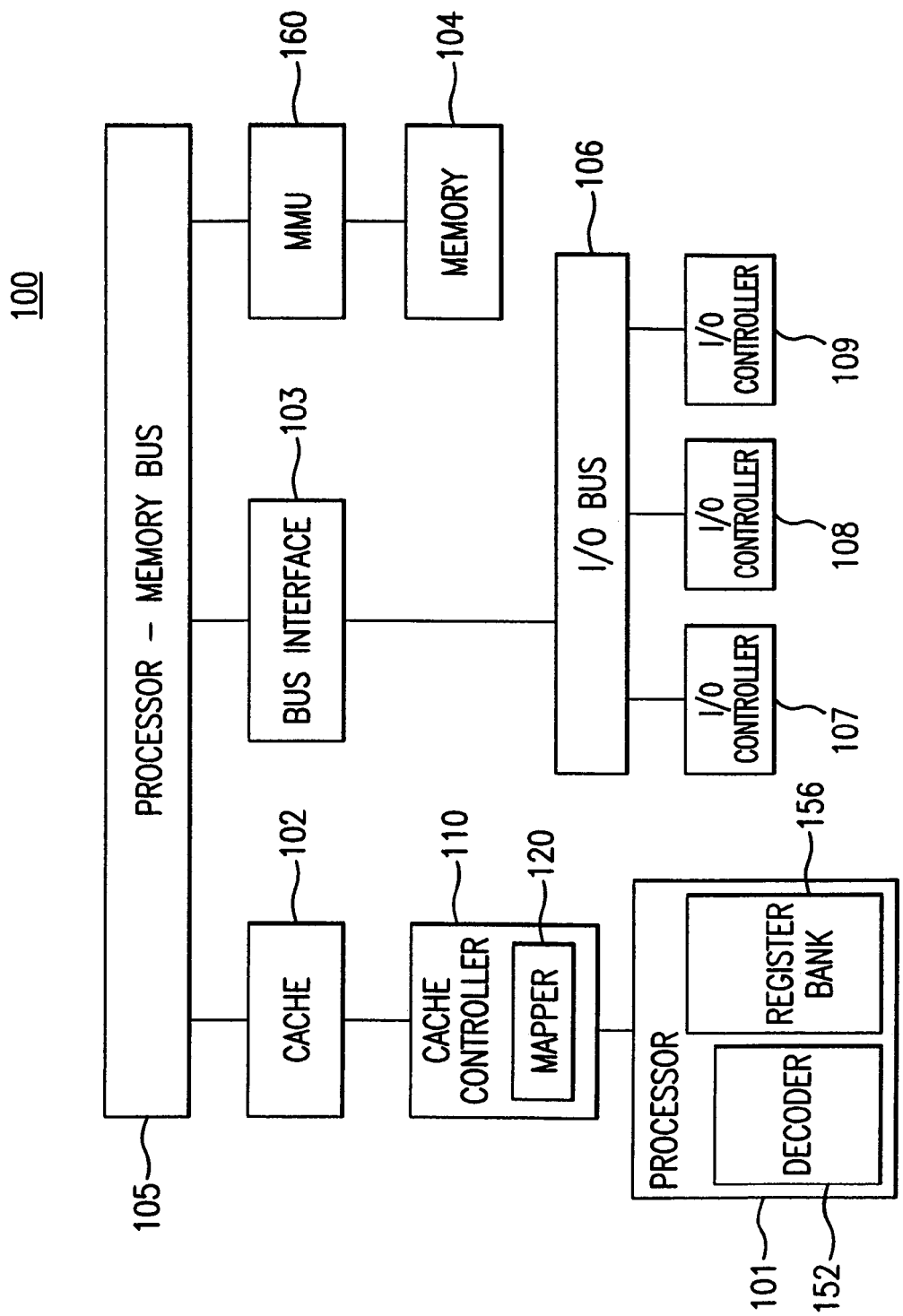
FIG. 1 is a block diagram illustrating a single-instruction set architecture processor system according to an embodiment of the invention.

FIG. 1 depicts an example environment for implementation of the present invention. Specifically, FIG. 1 depicts a processor system 100 for implementing the present invention.

System 100 comprises a processor 101, a cache 102, a cache controller 110, a memory 104, a memory management unit 160, and a processor-memory bus 105. A bus interface 103 couples processor-memory bus 105 to an input/output (I/O) bus 106 and a plurality of I/O controllers such as, for example, I/O controllers 107, 108, and 109. Cache controller 110 has a mapper 120. Processor 101 has a decoder 152 and a register bank 156.

Figure 2:
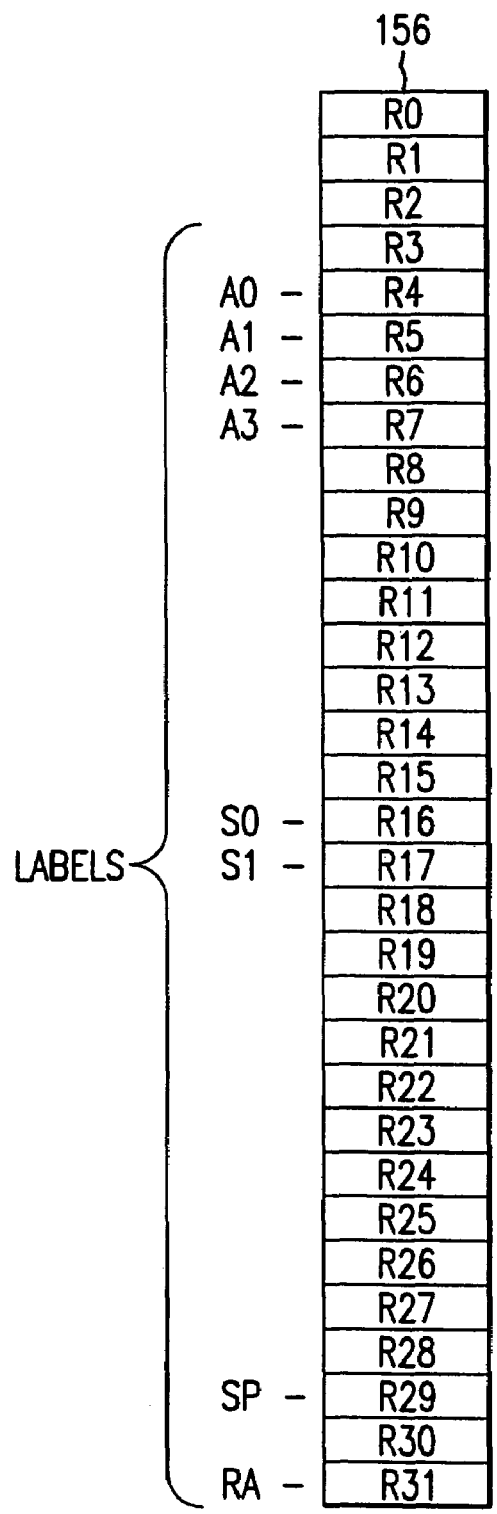
FIG. 2 illustrates an exemplary register bank according to an embodiment of the invention.

FIG. 2 illustrates an example register bank 156 having thirty-two registers labeled R0-R31. In other embodiments, register bank 156 may have more or less than thirty-two registers. Certain of the registers of register bank 156 are assigned labels. Registers R4, R5, R6, and R7 are shown labeled as argument registers A0, A1, A2, and A3, respectively. Registers R16 and R17 are labeled as static registers S0 and S1, respectively. A static register is a processor register which, by software convention, contains a data value that must be preserved across subroutine calls. A subroutine that respects a static register convention must exit with all static registers in the same state that they were in at subroutine entry. This can be achieved either by never modifying the static registers, or by saving the static value before any modified use of the register and then restoring the value before exit from the subroutine. Register R29 is labeled as stack pointer register SP. Register R31 is labeled as return address register RA. These labels are illustrative, and not intended to limit the invention. The labels are used below to further describe the invention.

Registers other than the registers labeled in FIG. 2 can be used to implement the invention, as will be understood by a person skilled in the relevant art given the description herein.

Figure 3:
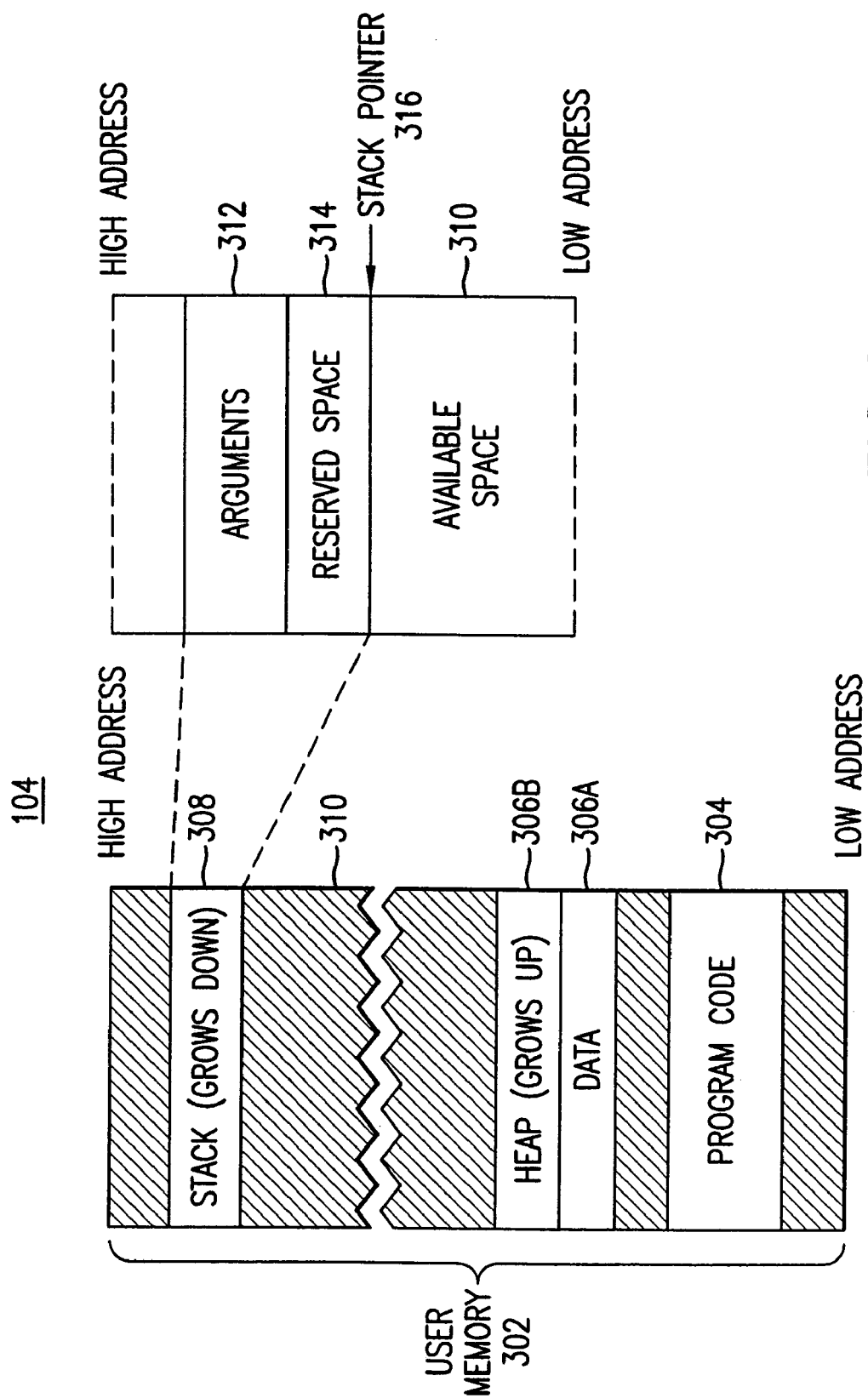
FIG. 3 illustrates an exemplary program stack in memory.

FIG. 3 illustrates a portion of memory 104 in greater detail. Memory 104 comprises a user memory 302 and an operating system memory (not shown). User memory 302 comprises five regions of interest. These regions are a program code region 304, a data region 306A, a heap region 306B, a stack region 308, and an unused or available space region 310. As can be seen in FIG. 3, stack region 308 typically comprise a region 312 for passing argument values to a subroutine via memory 104, and a reserved space for storing values passed to a subroutine in a register. A stack pointer 316 indicates the address of the next available memory location in region 310 of memory 104.

The program code region 304 is used to store the instructions of a program being implemented by system 100. Program instructions to be executed by the processor of system 100 must be read into cache memory 102 from main memory 104.

Heap 306B is used for globally meaningful or long-lived dynamic data, while stack 308 is used for locally significant and short-lived dynamic data. Allocation of heap memory 306B involves software manipulation of data structures in memory that control its explicit allocation. Allocation of dynamic data on stack 308 is done simply by updating the stack pointer 316 and remembering the stack pointer offset of each allocated data item. As shown in FIG. 3, stack 308 grows from higher memory addresses to lower memory address. In other embodiments of the invention, stack 308 can grow from lower memory addresses to higher memory addresses. The data region 306A is used to store static data.

Further description of the elements of system 100 can be found in any general computer design book. For example, see "Computer Organization & Design: the Hardware/Software Interface," by David A. Patterson and John L. Hennessy, 2nd ed., Morgan Kaufmann Publishers Inc., San Francisco, Calif., 1998, which is incorporated herein by reference in its entirety for all purposes.

The present invention is now described with reference to the features of system 100 which provides an example environment for implementation of the invention. It will be apparent to a person skilled in the art, however, that the invention can be implemented in other processor environments. For example, the invention can be implemented in a dual instruction set processor environment such as that described in commonly owned U.S. patent application Ser. No. 09/836,541, filed Apr. 18, 2001, and titled "Mapping System and Method for Instruction Set Processing," which is incorporated herein by reference as if reproduced in full below.

EXAMPLE METHOD EMBODIMENTS OF THE INVENTION

As described herein, the steps of method embodiments of the invention can be encoded in instructions that are stored as a part of a computer program. These methods are then implemented using a processor (e.g., processor 101). A processor according to the invention can decode the instructions described herein and perform the steps of the method embodiments.

Figure 4:
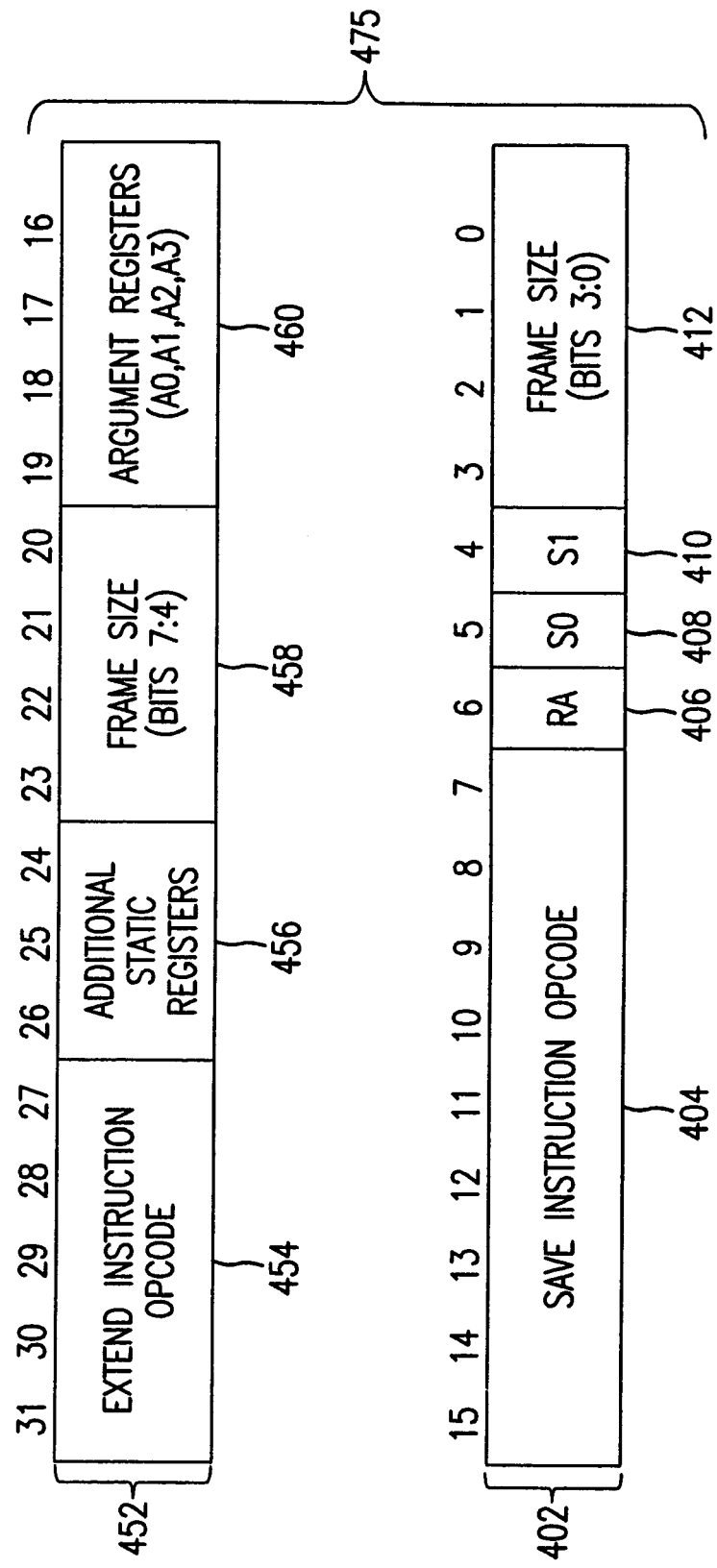
FIG. 4 illustrates two exemplary instructions for allocating memory and saving registers of a processor core on entry to a subroutine according to the invention.

FIG. 4 illustrates two exemplary 16-bit instructions 402 and 452 that encode method embodiments of the invention for saving registers and allocating stack memory upon entry to a subroutine. Instruction 402 can be executed as a single, stand-alone 16-bit instruction. In addition, instruction 402 can be executed in combination with instruction extension 452 as a 32-bit extended version of the 16-bit instruction (i.e., instruction 475).

Instruction 402 comprises five fields. These five fields are a 9-bit save instruction opcode field 404, a 1-bit return address register (RA) field 406, a 1-bit first static register (SO) field 408, a 1-bit second static register (S1) field 410, and a 4-bit frame-size field 412. As would be known to a person skilled in the relevant art, a return address register is used to store an address of an instruction that is to be executed upon exit from a subroutine, and a static register is used to store a value of a variable that must be preserved by a program before calling a subroutine. The purpose of each of these fields is described below with regard to the steps of method 500 and pseudo-code 650.

Instruction extension 452 comprises four fields. These four fields are a 5-bit extend instruction opcode field 454, a 3-bit additional static registers field 456, a 4-bit frame-size field 458, and a 4-bit argument registers field 460. As would be known to a person skilled in the relevant art, an argument register is used by a calling program to pass a value to a subroutine. The value in the argument register may or may not need to be preserved by the subroutine, depending on software convention. The purpose of each of these fields is described below with regard to the steps of method 500 and pseudo-code 800.

Figure 5A:
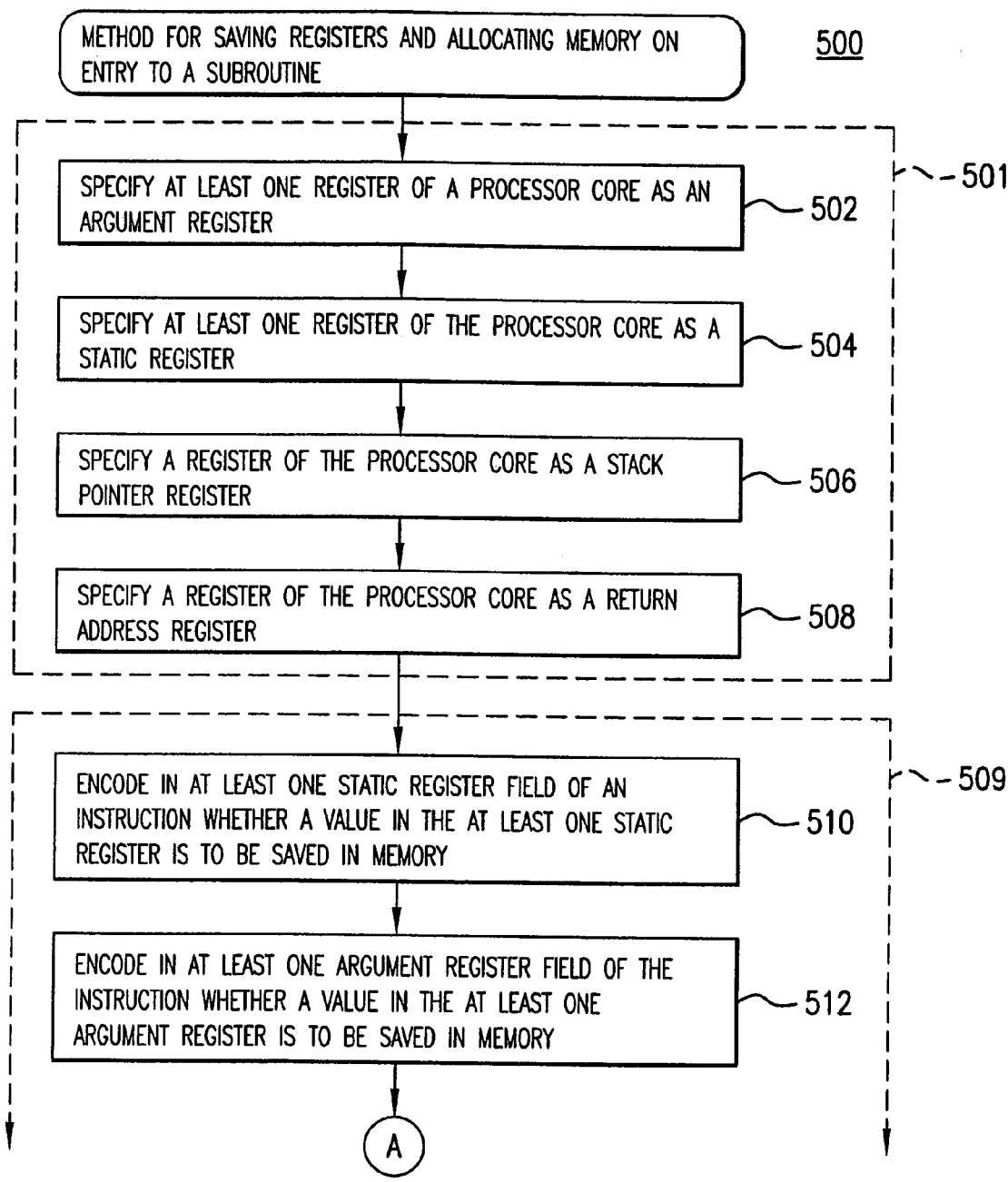
FIGS. 5A and 5B illustrate a flowchart of a method for saving registers and allocating memory on entry to a subroutine according to an embodiment of the invention.
Figure 5B:
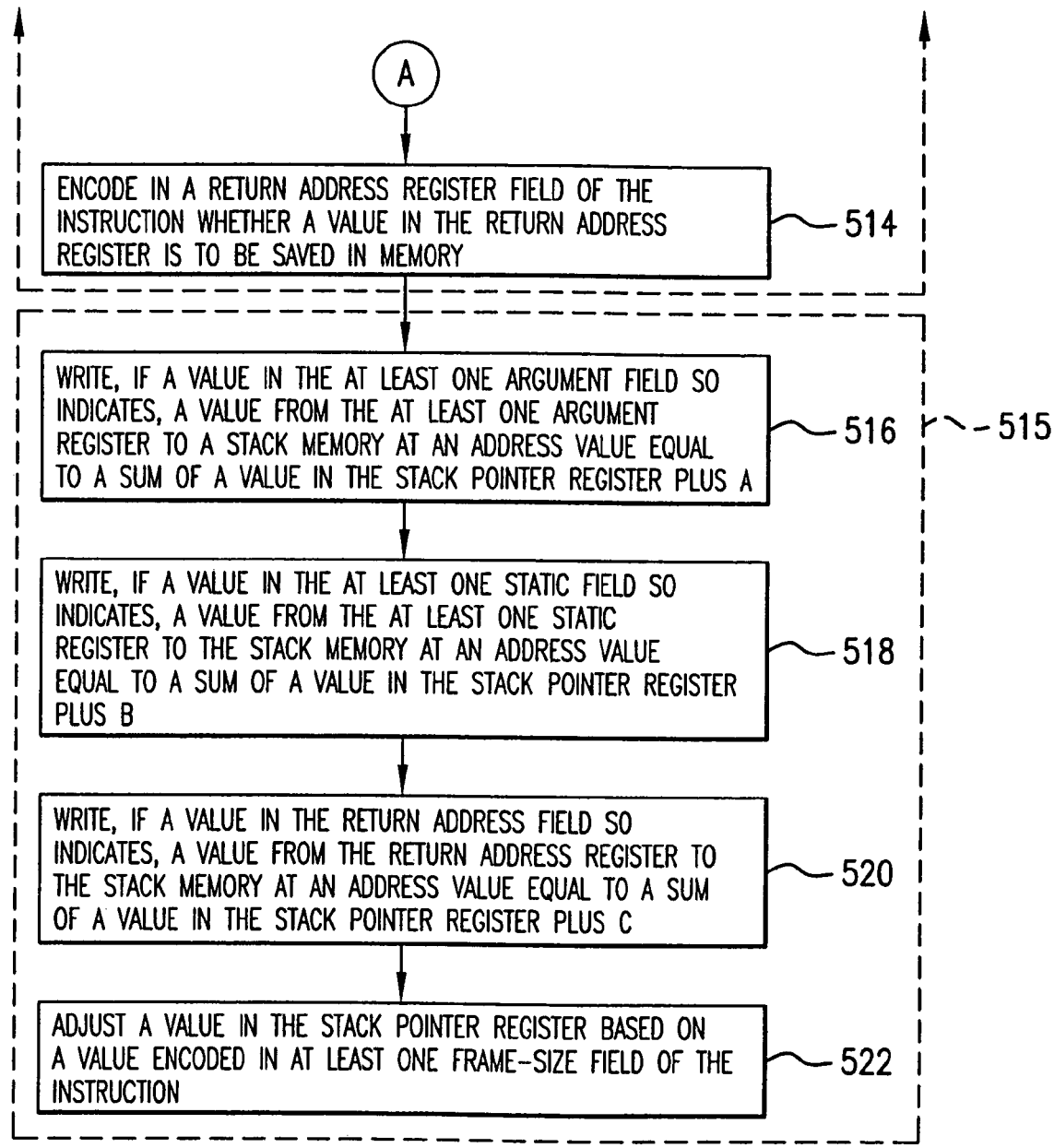

A method 500 for saving registers and allocating memory on entry to a subroutine according to the invention will now be described. FIGS. 5A and 5B illustrate a flowchart of the steps of method 500. As illustrated in the flowchart, method 500 comprises a plurality of steps divided up into three stages 501, 509, and 515. Stage 501 comprises steps 502, 504, 506, and 508, and is performed prior to or during development and/or implementation of a processor design. As will be understood by a person skilled in the relevant art(s), once these steps have been performed, they need not be repeated. Steps 502-508 are an inherent part of a processor, a mapper, a decoder and/or an instruction according to the invention. Stage 509 comprises steps 510, 512, and 514, and an encoding step implicit in step 522. These steps of method 500 are typically performed using a compiler program. A compiler program takes source code and uses the source code to determine a desired encoding for instructions according to the invention. Lastly, stage 515 comprises steps 516, 518, 520, and 522. These steps are performed by an apparatus or system according to the invention executing an instruction encoded according to the invention. As described herein, it is not necessary to perform each step of method 500 every time the method is implemented.

The steps of method 500 can be encoded by instruction 402 and/or instruction 475 for implementation by a processor. In the description that follows, method 500 is described in detail with regard to instruction 402, register bank 156, stack region 308 of memory 104, and pseudo-code 650 (shown in FIG. 6). Method 500 begins at a step 502.

In step 502, at least one general purpose register of register bank 156 is specified as an argument register. This is to enable subsequent steps of method 500 to be encoded using the fields of instructions 402 and 475. The number of argument registers specified will typically depend on the number of general purpose registers available in a processor core and/or the number of registers intended to be visible when using a particular instruction set. In an embodiment of the invention, registers R4, R5, R6, and R7 are specified as argument registers A0, A1, A2, and A3, respectively, as shown in FIG. 2. In other embodiments, more or less than four argument registers can be specified in step 502.

Specifying a general purpose register of register bank 156 in step 502 as an argument register is not intended to alter the nature of the general purpose register with regard to other instructions of an instruction set. In fact, a feature of the invention allows any specified argument register according to the invention to be treated as a general purpose register by instructions other than the instructions described herein, and thus maintain all the functionality of a general purpose register with regard to other instructions. Furthermore, this feature of the invention also applies to general purpose registers specified, for example, as a static register (e.g., S0 and S1), a stack pointer register (SP), and/or a return address register (RA) in accordance with method 500.

In step 504, at least one register of register bank 156 is specified as a static register. In the embodiment of FIG. 2, two registers R16 and R17 are specified as static registers S0 and S1, respectively. In other embodiments, more or less than two registers may be specified.

In step 506, a register of register bank 156 is specified as a stack pointer register (SP). The stack pointer register typically holds the address value of the next available memory location in memory 104. FIG. 3 illustrates a stack pointer 316. In the embodiment shown in FIG. 2, register R29 of register bank 156 is specified as the stack pointer register.

In step 508, a register of register bank 156 is specified as a return address register (RA). The return address register typically holds the address value of the next instruction to be executed upon exit from a subroutine. In the embodiment shown in FIG. 2, register R31 is specified as the return address register.

As would be understood by a person skilled in the relevant art, the purpose of specifying various registers of register bank 156 as either an argument register, a static register, a stack pointer register, or a return address register is to enable programs to be developed that can compile and link other program code written in a high level programing language such as, for example, C, C++, Pascal, and/or Fortran to run on a processor according to the invention. The number of registers specified in step 502 as argument registers and the number of registers specified in step 504 as static registers, however, may not be optimal for all applications. Thus, as described below, the invention enables a compiler program to encode in an instruction whether any or all of the argument registers specified in step 502 should be handled as static registers in order to enhance a particular feature of an application program. Method 500 enables a compiler program to encode in an instruction, for example, whether a value in a specified argument register is to be saved at one of two locations in a stack memory. How this is accomplished is described with regard to the following steps of method 500.

In step 510, fields 408 and 410 of instruction 402 are encoded to indicate whether static registers R16 and R17 are to be saved to region 310 of memory 104 upon entry to a subroutine. If a called subroutine will use a register that has been specified as a static register in step 504, the value of the specified static register is saved on stack 308 in order to preserve the value for the program that called the subroutine. For example, if a call subroutine will use register R16 of register bank 156, the value of register R16 is saved on stack 308 upon entry to the subroutine. A compiler program can ensure that the value of register R16 is saved on stack 308 by encoding a value in field 408 of instruction 402 (e.g., by setting bit 5 of instruction 402) that instructs a processor to save the value of register R16 on stack 308. In an embodiment, if the compiler clears bit 5 of instruction 402, the value of register R16 will not be saved on stack 308 when instruction 402 is executed. Similarly, whether a value in register R17 is saved on stack 308 when instruction 402 is executed by a processor is determined by the state if bit 4 of instruction 402. In an embodiment, if bit 4 is set, for example, the value of register R17 will be saved on stack 308 when instruction 402 is executed. If bit 4 is cleared, the value of register R17 will not be saved on stack 308 when instruction 402 is executed.

For the embodiment shown in FIG. 4, two 1-bit fields 408 and 410 are used to encode whether the values of two specified static registers are saved on stack 308. In other embodiments, a single multi-bit field can be used to encode whether values of specified static registers are saved. How to do this will be understood by a person skilled in the relevant art given the description herein.

Step 512 of method 500 is not performed by the method embodiment encoded by instruction 402. For the method embodiment encoded by instruction 402, it is assumed that each of the registers specified in step 502 are to be treated as argument registers by a called subroutine. This is not the case, however, for other method embodiments of the invention encoded, for example, using instruction 475. Step 512 is further described below with regard to instruction 475.

In step 514, field 406 of instruction 402 is encoded to indicate whether a value in return address register R31 is to be saved to region 310 of memory 104 upon entry to a subroutine. In an embodiment, for example, the value of register R31 will be saved on stack 308 when instruction 402 is executed if bit 6 of instruction 402 is set. If bit 6 is cleared, the value of register R31 will not be saved on stack 308 when instruction 402 is executed.

Step 516 of method 500 is also not performed by the method embodiment encoded by instruction 402. As described with regard to step 512, for the method encoded by instruction 402, it is assumed that each of the registers specified in step 502 is to be treated as an argument register by a called subroutine. Thus, none of the argument registers R4, R5, R6, or R7 is saved as a static upon entry to a subroutine.

In step 518, a value in register R16 is either saved or not saved on stack 308 when instruction 402 is executed. Whether the value in register R16 is saved is based on the encoding of field 408. If the value in register R16 is to be saved on stack 308, the address of the memory location where the value is saved may be calculated any number of ways, including for example the way shown in the pseudo-code of FIGS. 6 and/or 8A and 8B. In an embodiment, the value in register R16 is saved on stack 308 only if bit 5 of instruction 402 is set. Otherwise, the value of register R16 will not be saved when instruction 402 is executed. Similarly, in step 518, a value in register R17 will be saved on stack 308 when instruction 402 is executed only if bit 4 of instruction 402 is set. Otherwise, the value in register R17 will not be saved when instruction 402 is executed. If the value in register R17 is to be saved on stack 308, the address of the memory location where the value is saved may be calculated any number of ways, including for example the way shown in the pseudo-code of FIGS. 6 and/or 8A and 8B.

In step 520, a value in register R31 is either saved or not saved on stack 308 when instruction 402 is executed. Whether the value in register R31 is saved is based on the encoding of field 406. If the value in register R31 is to be saved on stack 308, the address of the memory location where the value is saved may be calculated any number of ways, including for example the way shown in the pseudo-code of FIGS. 6 and/or 8A and 8B. In an embodiment, the value in register R31 is saved on stack 308 only if bit 6 of instruction 402 is set. Otherwise, the value of register R31 will not be saved when instruction 402 is executed.

Lastly, in step 522, the value in the specified stack pointer register (R29) is adjusted based on a value encoded in field 412 of instruction 402. Adjusting the stack pointer allows a stack frame to be set up and memory to be allocated between the calling program and the called subroutine. In an embodiment, the value in the specified stack pointer register is adjusted by subtracting 8 times the value encoded in field 412 of instruction 402. If the value encoded in field 412 is zero, the value in the stack pointer register is adjusted by subtracting 128. In other embodiments, the value in the stack pointer register is adjusted by different amounts.

FIG. 6 illustrates pseudo-code 650 according to the invention. Pseudo-code 650 describes to a person skilled in the relevant art how a processor according to the invention operates to implement the steps of method 500 encoded in an instruction 402.

The steps of pseudo-code 650 will now be described. The steps of pseudo-code 650 are described with reference to register bank 156, stack 1300, and the example instruction 402A shown below and in FIG. 13. Stack 1300 is shown having memory locations M0-M14. As can be seen by examining the example instruction, the encodings of the instruction fields are: "1" for return address field 406; "1" for static register field 408; "1" for static register field 410; and "0100" (i.e., 4) for frame-size field 412. The encoding for the save instruction opcode field 404 is shown as "XXXXXXXX" to indicate that the encoding is a processor specific value that is unimportant for understanding the steps of pseudo-code 650.

| 15 | | | | 0 |
|---|---|---|---|---|
| XXXXXXXX | 1 | 1 | 1 | 0100 |

Implementation of pseudo-code 650 starts by storing the value of register R29 (the specified stack pointer) to a temporary variable. The temporary variables in pseudo-code do not represent program variables in memory or registers, but rather temporary values of internal state within a processor. At the start of pseudo-code 650, the stack pointer is assumed to have a value equal to that of stack memory location M12. After storing the stack pointer value, the value of return address field 406 is examined. In the case of the example instruction above, the encoded value is 1. Thus, the value of the temporary variable is reduced by four and the value in register R31 (the return address) is saved at memory location M11. Next, the value of static field 410 is examined. In the case of the example instruction above, the encoded value is 1. Thus, the value of the temporary variable is again reduced by four and the value in register R17 (register S1) is saved at memory location M10. Next, the value of static field 408 is examined. In the case of the example instruction above, the encoded value is 1. Thus, the value of the temporary variable is again reduced by four and the value in register R16 (register S0) is saved at memory location M9. Lastly, the value of frame-size field 412 is examined. In the case of the example instruction above, the encoded value is 4. As indicated by pseudo-code 650, the value in the specified stack pointer register (R29) is adjusted by shifting the value in frame-size field 412 left three bits, padding the new value with zeros, and then subtracting the new value from the value in register R29. At the end of this operation, the stack pointer points at a memory location M4, thereby defining a stack frame from M11 to M4.

Figure 13:
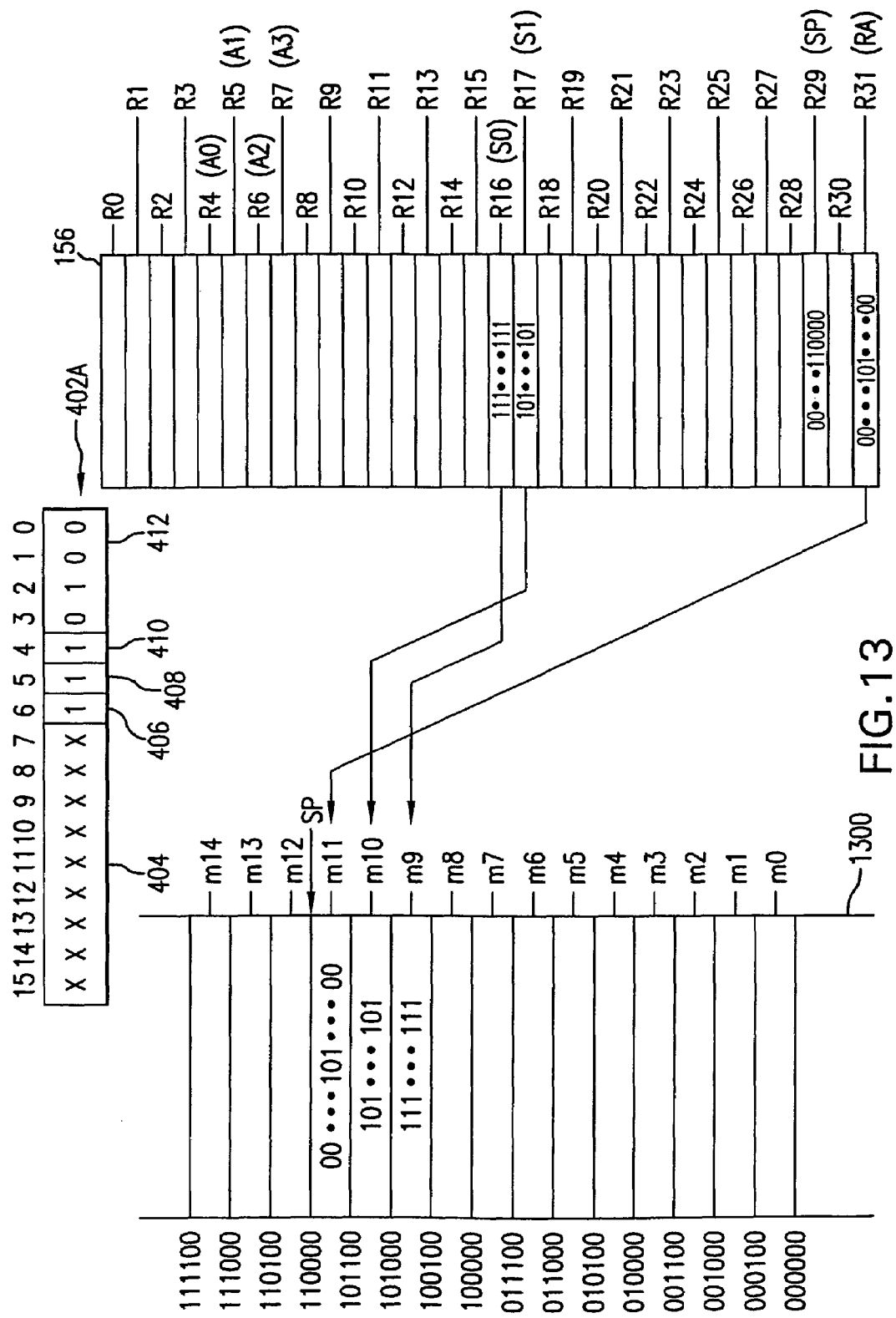
Figure 14:
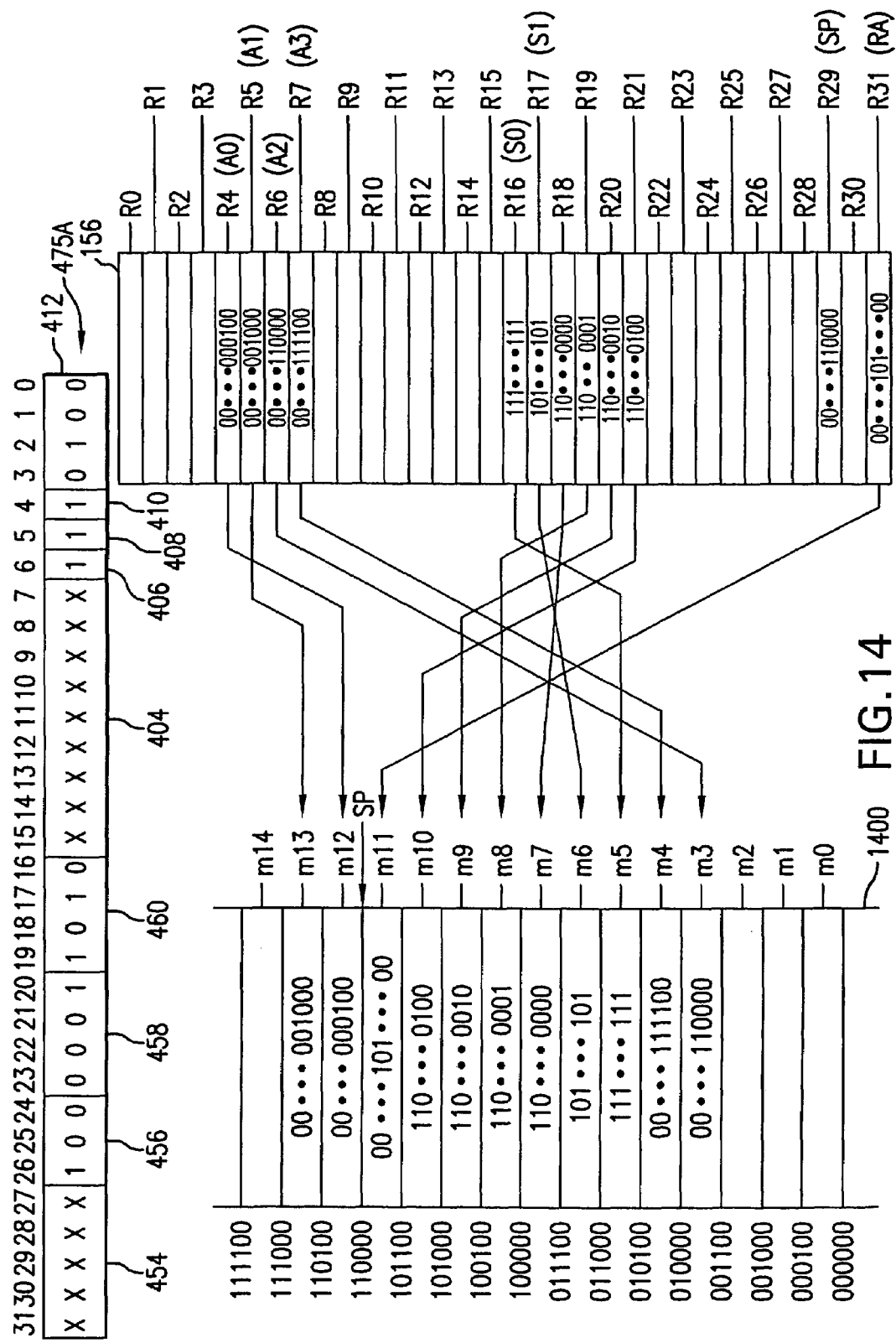

As will be understood by a person skilled in the relevant art, the stack pointer is adjusted in the above example to reserve space, for example, for storing values of the specified argument registers (i.e., R4, R5, R6, and R7) in stack 1300. As shown in FIG. 13, memory locations M4, M5, M6, and M7 can be used to save the values of registers R7, R6, R5, and R4, respectively, if necessary. Additional space, below memory location M4, can be reserved by increasing the value encoded in field 412 of instruction 402A.

Method 500 will now be described in detail with regard to instruction 475, register bank 156, stack 1400 (shown in FIG. 14), and pseudo-code 800 (shown in FIGS. 8A and 8B) in order to point out differences between instruction 475 and instruction 402.

As will be understood by a person skilled in the relevant art given the description herein, steps 502, 504, 506, and 508 do not change when instruction 475 is used to encode method 500 rather than instruction 402. Thus, the description for theses steps in not repeated here.

In step 510, fields 408 and 410 of instruction 475 are encoded to indicate whether specified static registers R16 and R17 are to be saved on stack 1400 upon entry to a subroutine. If a called subroutine will use a register that has been specified as a static register in step 504, the value of the specified static register is save on stack 1400 in order to preserve the value for the program that called the subroutine. As described below, in an embodiment the value of register R16 is saved at memory location M5 during execution of instruction 475 by setting bit 5 of instruction 475 to a value of 1. If bit 5 of instruction 475 is 0, the value of register R16 will not be saved on stack 1400 when instruction 475 is executed. Similarly, whether a value in register R17 is saved at a memory location on stack 1400 when instruction 475 is executed by a processor is determined by the state if bit 4 of instruction 475. If bit 4 is set, the value of register R17 will be saved, for example in memory location M6 when instruction 402 is executed. If bit 4 is cleared, the value of register R17 will not be saved when instruction 402 is executed.

In step 512 of method 500, a binary value (e.g., 4-bit binary value) is encoded in argument registers field 460 (aregs) of instruction extension 452 to indicate which registers specified as argument registers in step 502 are to be treated and saved during execution of instruction 475 as static registers. FIG. 7 illustrates a 4-bit binary encoding used in an embodiment of the invention. Other encodings, however, can also be used in accordance with method 500.

In step 514, field 406 of instruction 475 is encoded to indicate whether a value in specified return address register R31 is to be saved, for example, at a memory location M11 upon entry to a subroutine. In an embodiment, for example, the value of register R31 will be saved when instruction 475 is executed in memory location M11 if bit 6 of instruction 475 is set. If bit 6 is cleared, the value of register R31 will not be saved when instruction 475 is executed.

In step 516, none, one, two, three, or four of the registers R4 (A0), R5 (A1), R6 (A2), or R7 (A3) specified as argument registers in step 502 are saved on stack 1400 during execution of instruction 475. Which, if any, specified argument registers are saved depends on the value encoded in field 460 of instruction 475. FIG. 7 shows which specified argument registers are treated as argument registers and which specified argument registers are treated as static registers for the 4-bit binary encoding illustrated in FIG. 7. If one or more values in registers R4, R5, R6, and R7 are to be saved on stack 1400, the addresses of the memory locations where the values are saved may be calculated any number of ways, including for example the way shown in the pseudo-code of FIGS. 8A and 8B.

In step 518, a value in register R16 (S0) is either saved or not saved on stack 1400 when instruction 475 is executed. Whether the value in register R16 is saved is based on the encoding of field 408. If the value in register R16 is to be saved on stack 1400, the address of the memory location where the value is saved may be calculated any number of ways, including for example the way shown in the pseudo-code of FIGS. 6 and/or 8A and 8B. In an embodiment, the value in register R16 is saved on stack 1400 only if bit 5 of instruction 475 is set. Otherwise, the value of register R16 will not be saved when instruction 475 is executed. Similarly, in step 518, a value in register R17 (S1) will be saved on stack 1400 when instruction 475 is executed only if bit 4 of instruction 475 is set. Otherwise, the value in register R17 will not be saved when instruction 475 is executed. If the value in register R17 is to be saved on stack 1400, the address of the memory location where the value is saved may be calculated any number of ways, including for example the way shown in the pseudo-code of FIGS. 6 and/or 8A and 8B.

In step 520, a value in register R31 (RA) is either saved or not saved on stack 1400 when instruction 475 is executed. Whether the value in register R31 is saved is based on the encoding of field 406. If the value in register R31 is to be saved on stack 1400, the address of the memory location where the value is saved may be calculated any number of ways, including for example the way shown in the pseudo-code of FIGS. 6 and/or 8A and 8B. In an embodiment, the value in register R31 is saved on stack 1400 only if bit 6 of instruction 475 is set. Otherwise, the value of register R31 will not be saved when instruction 475 is executed.

In step 522, the value in register R29 (SP) is adjusted based on a value encoded in fields 458 and 412 of instruction 475. Adjusting the stack pointer value in register R29 allows a stack frame to be set up. In an embodiment, the value in register R29 is adjusted by subtracting 8 times the value encoded in fields 412 and 458 of instruction 475. The 4-bits of field 458 and the 4-bits of field 412 are concatenated to form an 8-bit frame-size value. In other embodiments, the value in register R29 is adjusted by different amounts.

Field 456 of instruction 475 is used to encode whether additional registers of register bank 156 are to be treated as static registers. For example, in an embodiment, registers R18, R19, R20, R21, R22, R23, and R30 can be treated as additional static registers. This feature of the invention is further described below with reference to pseudo-code 800.

FIGS. 8A and 8B illustrate pseudo-code 800 according to the invention. Pseudo-code 800 describes to a person skilled in the relevant art how a processor according to the invention implements the steps of method 500 encoded in an instruction 475.

The steps of pseudo-code 800 will now be described. The steps of pseudo-code 800 are described with reference to register bank 156, stack 1400, and example instruction 475A shown below and in FIG. 14. As can be seen by examining the example instruction, the encodings of the instruction fields are: "1" for return address field 406; "1" for static register field 408; "1" for static register field 410; "00010100" (i.e., 20) for the concatenated frame-size fields 458 and 412; "100" for the additional static registers field 456; and "1010" for the argument registers field 460. The encodings for the save instruction opcode field 404 and the extend instruction opcode field 454 are shown as "XXXXXXXXX" and "XXXXX," respectfully, to indicate that these encodings are processor specific values that are unimportant for understanding the steps of pseudo-code 800.

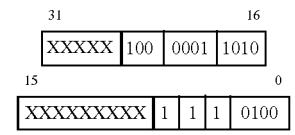

Implementation of pseudo-code 800 starts by storing the value of register R29 (the stack pointer) to two temporary variables. At the start of pseudo-code 800, the stack pointer is assumed to be pointing at memory location M12.

After saving the value of the stack pointer in two temporary variables, the number of argument registers is determined. In the example instruction above, the number encoded in field 460 is "1010." By looking at either FIG. 7 or pseudo-code 800, it can be determined that the values in registers R4 and R5 are to be treaded and stored as argument values (e.g., they are to be stored as values associated with storage already allocated on the stack). In accordance with the method of the invention described by pseudo-code 800, the values of argument registers are stored at a stack memory location set up or reserved by a calling program, and thus these values are not restored when control is returned to the calling program. As can be seen in pseudo-code 800, the value of register R4 (A0) is stored at memory location M12, and the value of register R5 (A1) is stored at memory location M13.

After saving the values of the argument registers, the value of return address field 406 is examined. In the case of the example instruction 475A, the encoded value is 1. Thus, the value of the first temporary variable is reduced by four and the value in register R31 (the return address) is saved at memory location M11.

The next action is to save any additional static registers on stack 1400 as indicated by the encoding in register field 456 of instruction 475A. In an embodiment, the encoding "100" indicates that the values of registers R18, R19, R20, and R21 are to be saved on stack 1400 as static values (e.g., they are to be saved as values associated with storage not yet allocated on the stack). As indicated by pseudo-code 800, the value of register R21 is stored at memory location M10. The values of registers R20, R19, and R18 are stored at memory locations M9, M8, and M7, respectfully.

Next, the value of static field 410 is examined. In the case of example instruction 475A, the encoded value is 1. Thus, the value of the first temporary variable is reduced by four and the value in register R17 (register S1) is saved at memory location M6.

The value of static field 408 is examined next. In the case of example instruction 475A, the encoded value is 1. Thus, the value of the first temporary variable is again reduced by four and the value in register R16 (register S0) is saved at memory location M5.

The next step of pseudo-code 800 is to store any argument registers on stack 1400 that are to be treated as static registers in accordance with the encoding of field 460. From looking at either FIG. 7 or pseudo-code 800, it can be determined that the values in register R6 (A2) and R7 (A3) are to be saved on stack 1400 as static values. The value of register R7 is saved at memory location M4. The value of register R6 is saved at memory location M3.

Lastly, the concatenated value of frame-size fields 458 and 412 is examined and used to adjust the value in the stack pointer register, R29 (SP). In the case of example instruction 475A, the encoded value is 20. As indicated by pseudo-code 800, the value in the register R29 is adjusted by shifting the concatenated frame-size value left three bits, padding the new value with zeros, and then subtracting the new value from the value in register R29. At the end of this operation, the stack pointer points to a memory location on stack 1400 below memory location M0.

Figure 15:
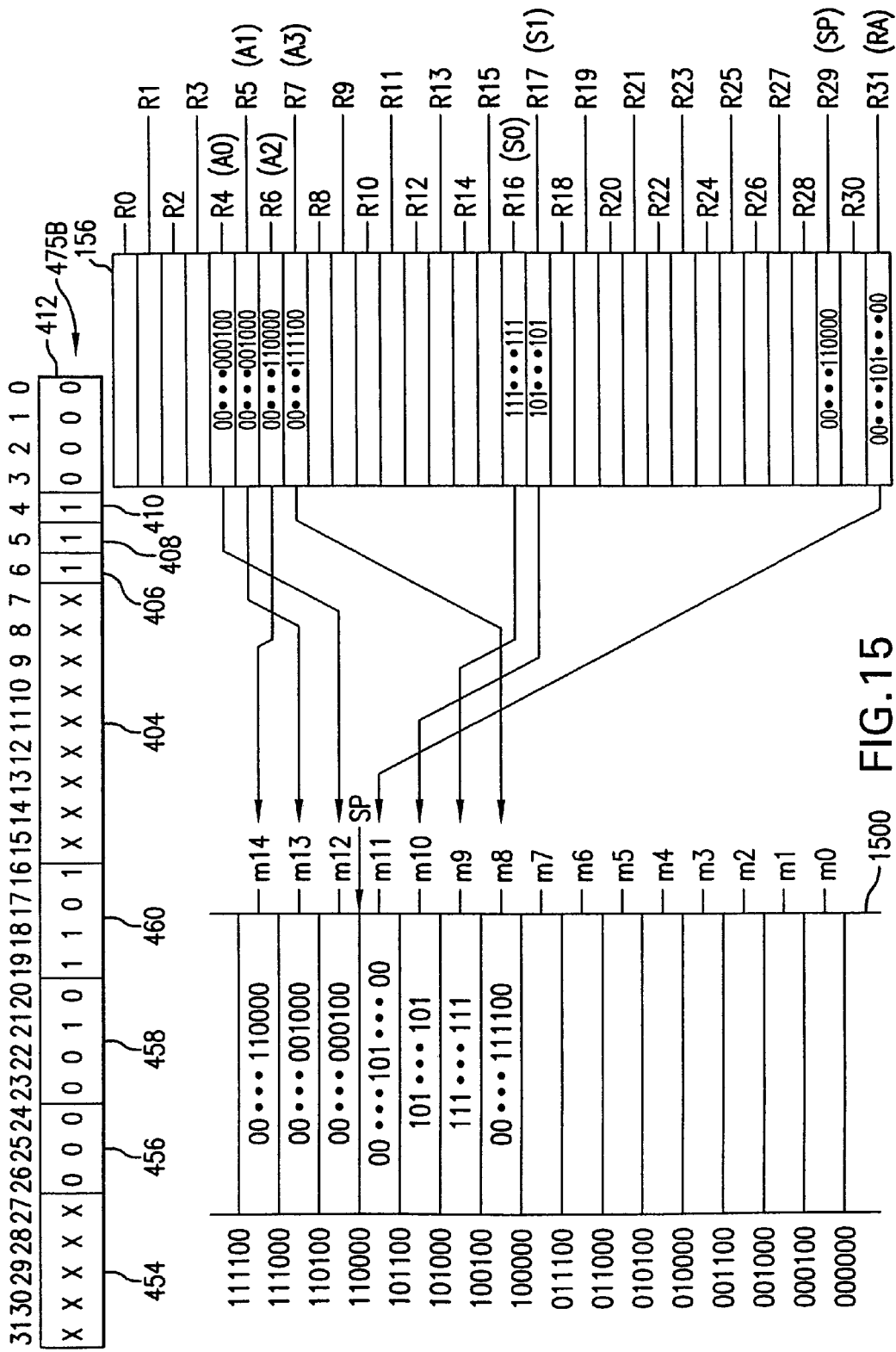
Figure 16:
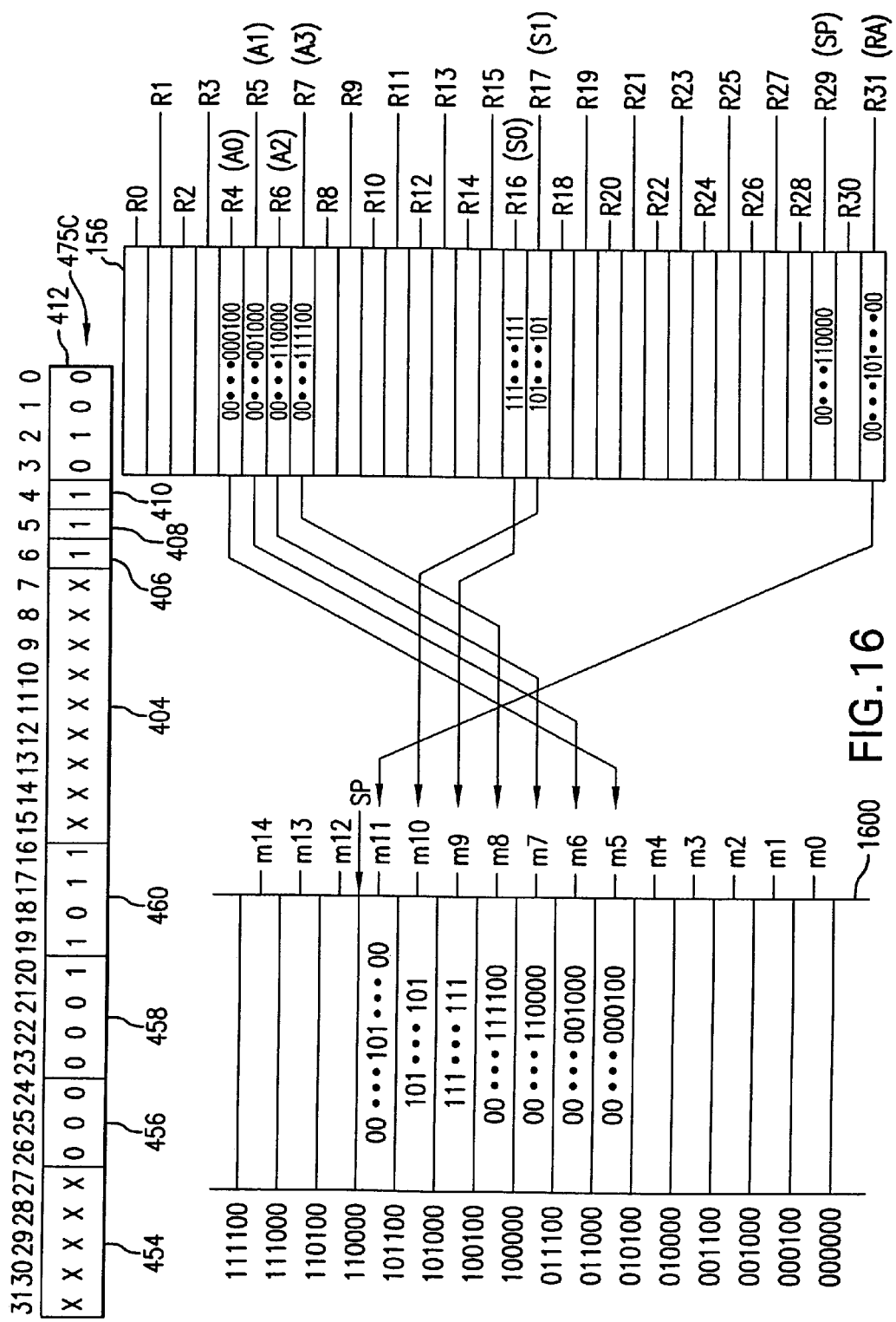
Figure 17:
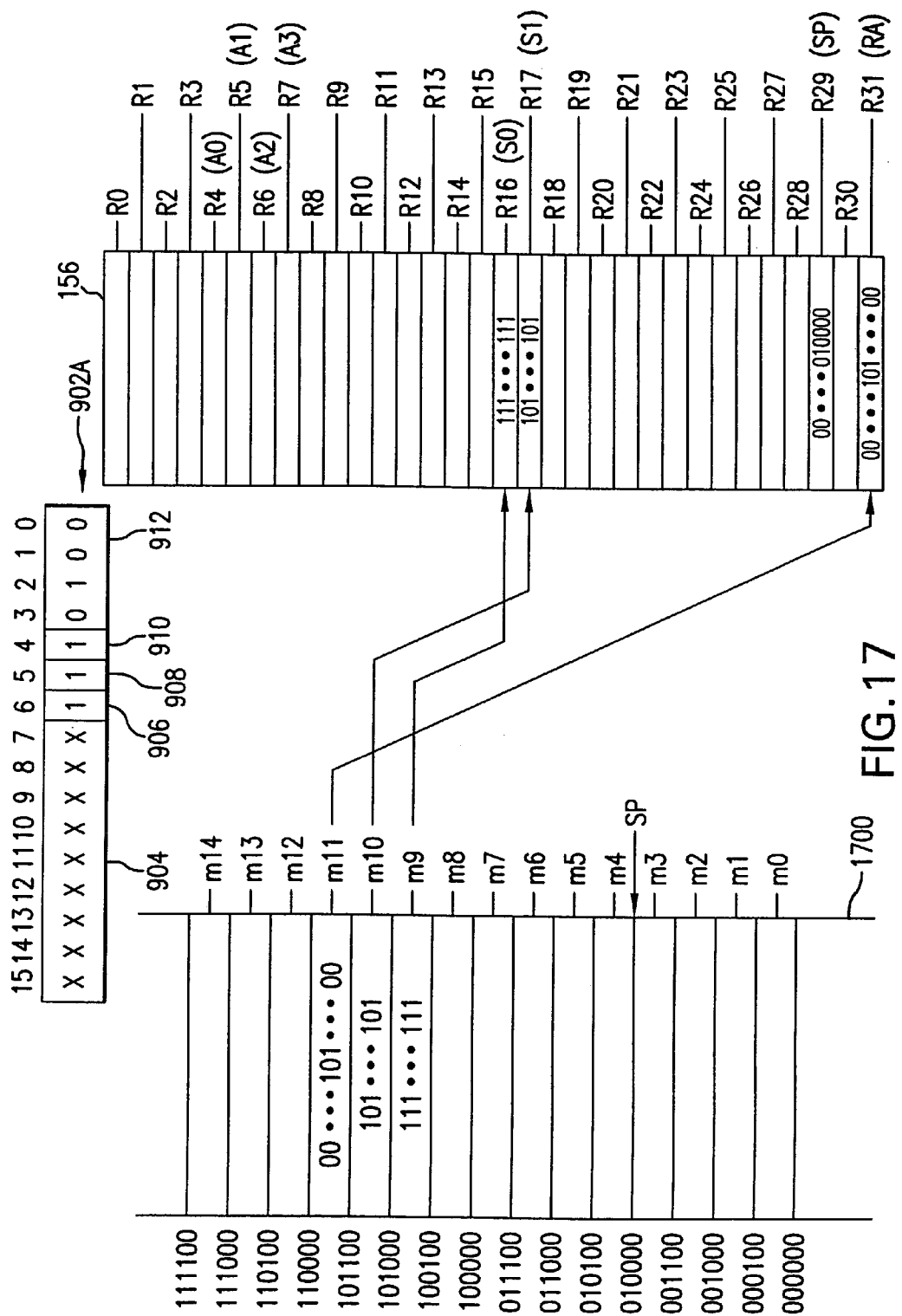
Figure 18:
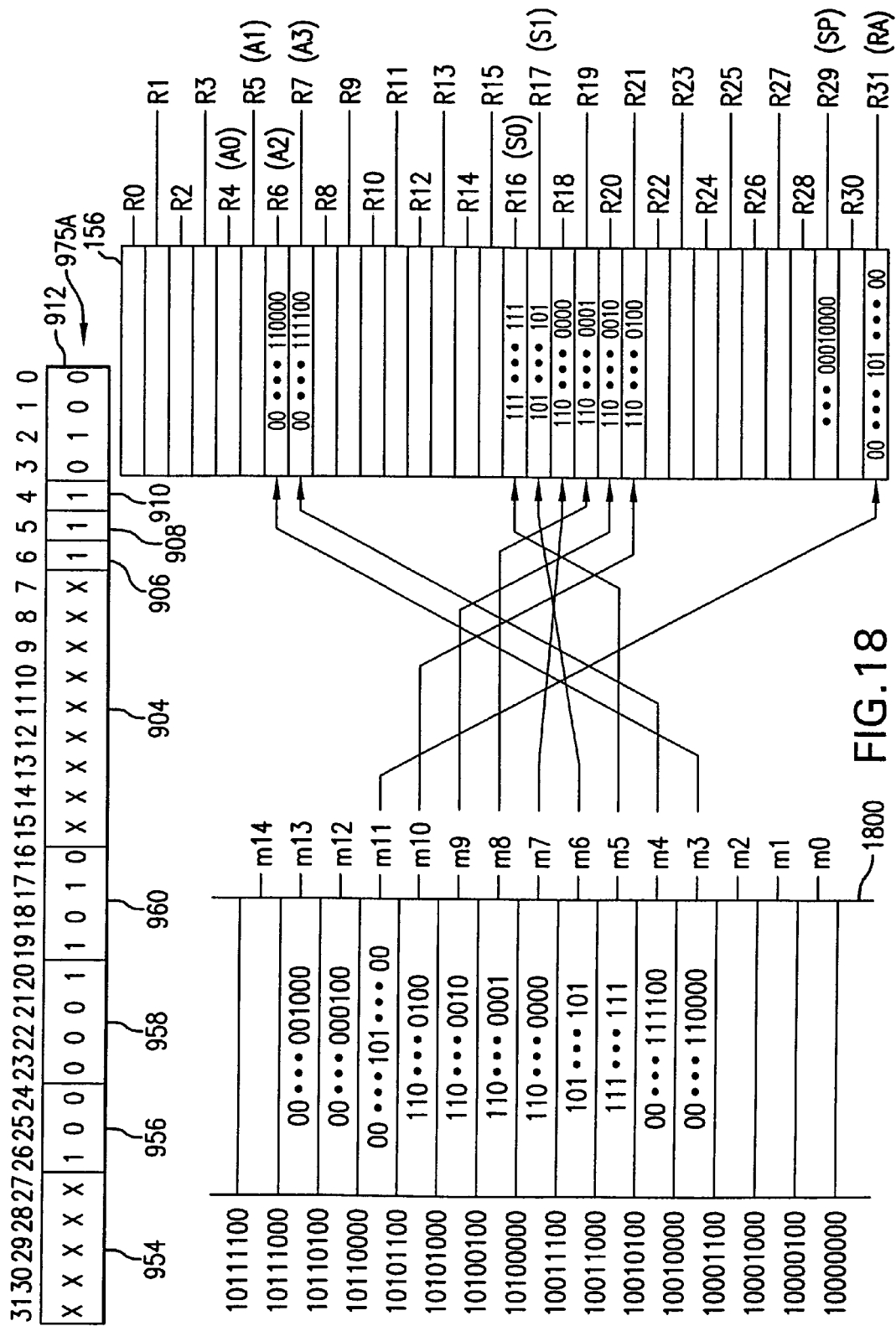

FIGS. 15 and 16 illustrate the operation of two additional example save instructions 475B and 475C encoded according to the embodiment of the invention described above. The instructions are assumed to be implemented using a processor operating in accordance with pseudo-code 800. As will be understood by a person skilled in the relevant art given the description herein, the invention allows software tools (e.g., a compiler) to flexibly determine whether values stored in a specified argument register are to be treated as argument values or statics values.

Figure 9:
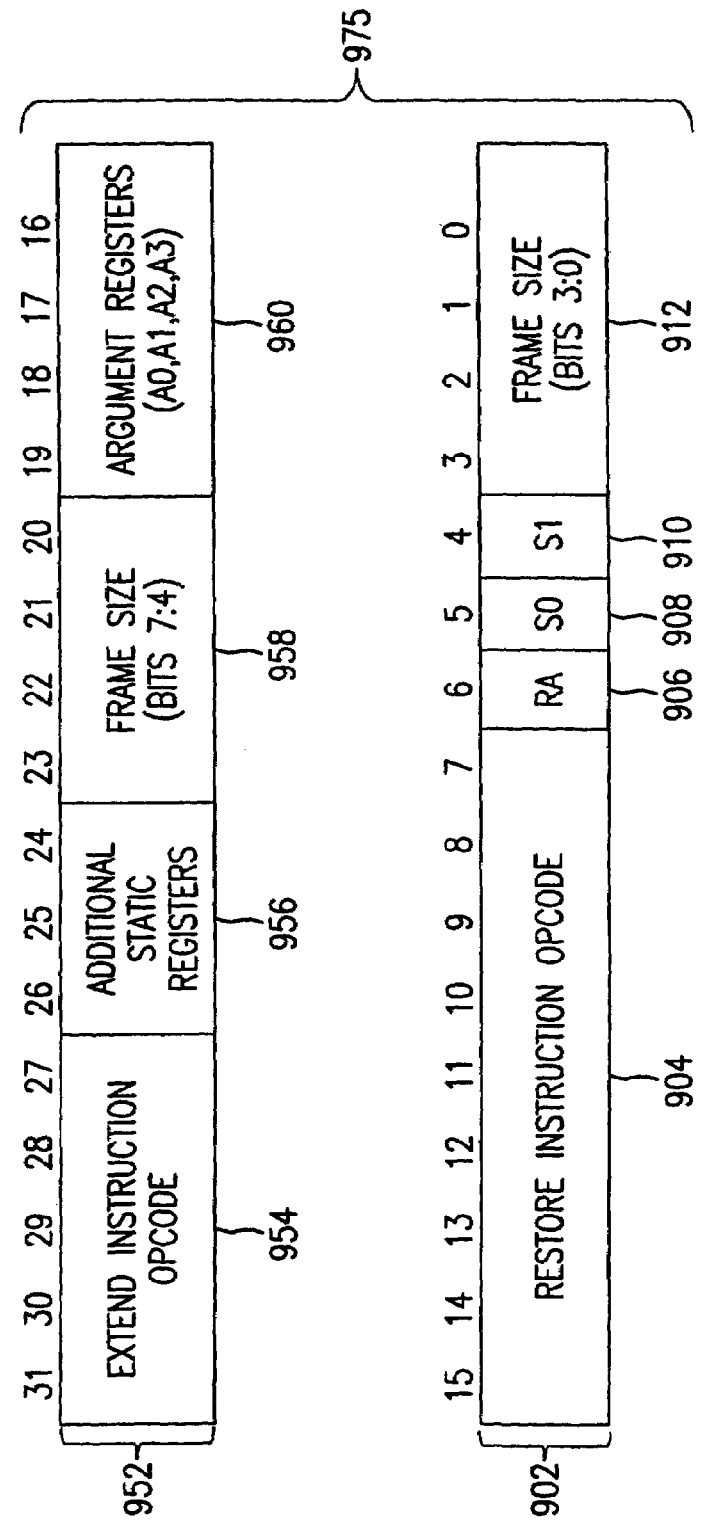
FIG. 9 illustrates two exemplary instructions for deallocating memory and restoring registers of a processor core before exit from a subroutine according to the invention.

FIG. 9 illustrates two exemplary 16-bit instructions 902 and 975 that encode method embodiments of the invention for restoring registers and deallocating memory before exit from a subroutine. Instruction 902 can be executed as a single, stand-alone 16-bit instruction. In addition, instruction 902 can be executed in combination with instruction extension 952 as an extended 16-bit instruction or a 32-bit instruction 975.

Instruction 902 comprises five fields. These five fields are a 9-bit restore instruction opcode field 904, a 1-bit return address register (RA) field 906, a 1-bit first static register (S0) field 908, a 1-bit second static register (S1) field 910, and a 4-bit frame-size field 912. The purpose of each of these fields is described below with regard to the steps of method 1000 and pseudo-code 1100.

Instruction extension 952 comprises four fields. These four fields are a 5-bit extend instruction opcode field 954, a 3-bit additional static registers field 956, a 4-bit frame-size field 958, and a 4-bit arguments registers field 960. The purpose of each of these fields is described below with regard to the steps of method 1000 and pseudo-code 1200.

A method 1000 for restoring registers and deallocating memory before exit from a subroutine according to the invention will now be describe. The steps of method 1000 can be encoded by instruction 902 and/or instruction 975 for implementation by a processor.

FIGS. 10A and 10B illustrate a flowchart of the steps of method 1000. As illustrated in the flowchart, method 1000 comprises a plurality of steps divided up into three stages 1001, 1009, and 1015. Stage 1001 comprises steps 1002, 1004, 1006, and 1008, and is performed prior to or during development and/or implementation of a processor design. As will be understood by a person skilled in the relevant art(s), once these steps have been performed, they need not be repeated. Steps 1002-1008 are an inherent part of a processor, a mapper, a decoder and/or an instruction according to the invention. Stage 1009 comprises steps 1010, 1012, and 1014, and an encoding step implicit in step 1022. These steps of method 1000 are typically performed using a compiler program. Lastly, stage 1015 comprises steps 1016, 1018, 1020, and 1022. These steps are performed by an apparatus or system according to the invention executing an instruction encoded according to the invention. As described herein, it is not necessary to perform each step of method 1000 every time the method is implemented.

In the description that follows, method 1000 is described with regard to instruction 902, register bank 156, stack 1700 (shown in FIG. 17), and pseudo-code 1100 (shown in FIG. 11). Because many of the steps of method 1000 are similar to the steps of method 500, some of the steps of method 1000 are described with less detail than the steps of method 500.

Method 1000 begins at a step 1002. In step 1002, at least one register of register bank 156 is specified as an argument register. In an embodiment of the invention, registers R4, R5, R6, and R7 are specified as argument registers A0, A1, A2, and A3, respectively. In other embodiments, more or less than four argument registers can be specified in step 1002. Because instructions 902 and 975 are intended to be used in conjunction with instructions 402 and 475, the same argument registers should be specified in step 1002 as are specified in step 502 of method 500 above.

As already described herein, specifying a general purpose register of register bank 156 as an argument register is not intended to alter the nature of the general purpose register with regard to other instructions of an instruction set. A feature of the invention allows any specified argument register according to the invention to be treated as a general purpose register by instructions other than the instructions described herein. General purpose registers thus maintain all the functionality of a general purpose register with regard to other instructions. This feature of the invention applies to general purpose registers specified, for example, as a static register (e.g., S0 and S1), a stack pointer register (SP), and/or a return address register (RA) in accordance with method 1000.

In step 1004, at least one register of register bank 156 is specified as a static register. In the embodiment of FIG. 2, two registers R16 and R17 are specified as static registers S0 and S1, respectively. In other embodiments, more or less than two registers may be specified. Again, because instructions 902 and 975 are intended to be used in conjunction with instructions 402 and 475, the same static registers should be specified in step 1004 as are specified in step 504 of method 500 above.

In step 1006, a register of register bank 156 is specified as a stack pointer register. In the embodiment shown in FIG. 2, register R29 of register bank 156 is specified as the stack pointer register.

In step 1008, a register of register bank 156 is specified as a return address register. In the embodiment shown in FIG. 2, register R31 is specified as the return address register.

In step 1010, fields 908 and 910 of instruction 902 are encoded to indicate whether static registers R16 and R17 are to be restored from stack 1700 before exit from a subroutine. In an embodiment, if bit 4 is set, the value of register R17 will be restored from stack 1700 when instruction 902 is executed. If bit 4 is cleared, the value of register R17 will not be restored from stack 1700 when instruction 902 is executed. Similarly, in an embodiment, if bit 5 is set, the value of register R16 will be restored from stack 1700 when instruction 902 is executed. If bit 5 is cleared, the value of register R16 will not be restored from stack 1700 when instruction 902 is executed.

Step 1012 of method 1000 is not performed by the method embodiment encoded by instruction 902. For the method embodiment encoded by instruction 902, it is assumed that each of the registers specified in step 1002 is to be treated as an argument register. This is not the case, however, for other method embodiments of the invention encoded, for example, using instruction 975. Step 1012 is further described below with regard to instruction 975.

In step 1014, field 906 of instruction 902 is encoded to indicate whether a return address value in stack 1700 should be restored to address register R31 before exit from a subroutine. In an embodiment, for example, a return address value will be loaded into register R31 from stack 1700 when instruction 902 is executed only if bit 6 of instruction 902 is set. If bit 6 is cleared, the return address value will not be loaded into register R31 when instruction 902 is executed.

Step 1016 of method 1000 is also not performed by the method embodiment encoded by instruction 902. As described with regard to step 1012, it is assumed that each of the registers specified in step 1002 is to be treated as an argument register. Thus, none of the argument registers R4, R5, R6, or R7 is restored before exit from a subroutine.

In step 1018, a static value is either loaded or not loaded into register R16 from stack 1700 when instruction 902 is executed. Whether a static value is loaded into register R16 is based on the encoding of field 908. In an embodiment, the static value of register R16 is restored only if bit 5 of instruction 902 is set. Otherwise, the value of register R16 will not be restored when instruction 902 is executed. Similarly, in step 1018, a static value of register R17 will be restored from stack 1700 when instruction 902 is executed only if bit 4 of instruction 902 is set. Otherwise, the value of register R17 will not be restored when instruction 902 is executed.

In step 1020, a return address value is either loaded or not loaded into register R31 from stack 1700 when instruction 902 is executed. Whether the return address value is loaded into register R31 is based on the encoding of field 906. In an embodiment, the return address value is loaded into register R31 only if bit 6 of instruction 902 is set. Otherwise, the return address value is not loaded into register R31 when instruction 902 is executed.

Lastly, in step 1022, the value in the stack pointer register (R29) is adjusted based on a value encoded in field 912 of instruction 902. Adjusting the stack pointer allows a stack frame to be deallocated before exit from a subroutine. In an embodiment, the value in the stack pointer register is adjusted by adding 8 times the value encoded in field 912 of instruction 902 to the value of register R29. If the value encoded in field 912 is zero, the value in the stack pointer register is adjusted by adding 128. In other embodiments, the value in the stack pointer register is adjusted by different amounts.

FIG. 11 illustrates pseudo-code 1100 according to the invention. Pseudo-code 1100 describes to a person skilled in the relevant art how a processor according to the invention implements the steps of method 1100 encoded in an instruction 902.

The steps of pseudo-code 1100 will now be described. The steps of pseudo-code 1100 are described with reference to register bank 156, stack 1700, and example instruction 902A shown below and in FIG. 17. Example instruction 902A can be used to restore register values save to the stack by example instruction 402A, described above. As can be seen by examining example instruction 902A, the encodings of the instruction fields are: "1" for return address field 906; "1" for static register field 908; "1" for static register field 910; and "0100" (i.e., 4) for frame-size field 912. The encoding for the restore instruction opcode field 904 is shown as "XXXXXXXXX" to indicate that the encoding is a processor specific value that is unimportant for understanding the steps of pseudo-code 1100.

| 15 | | | | 0 |
|---|---|---|---|---|
| XXXXXXXX | 1 | 1 | 1 | 0100 |

Implementation of pseudo-code 1100 starts by adjusting the value of register R29 (the stack pointer) and saving the new value to a temporary variable. At the start of pseudo-code 1100, the stack pointer is assumed to point to memory location M4. The new value saved in the temporary variable points to memory location M12.

After storing the adjusted stack pointer value to a temporary variable, the value of return address field 906 is examined. In the case of example instruction 902A, the encoded value is 1. Thus, the value of the temporary variable is reduced by four and the value at memory location M11 (the return address) is loaded into register R31.

Next, the value of static field 910 is examined. In the case of example instruction 902A above, the encoded value is 1.

Thus, the value of the temporary variable is again reduced by four and the value saved at memory location M10 is loaded into register R17 (register S1). Similarly, the value of static field 908 is examined. In the case of the example instruction 902A, the encoded value is 1. Thus, the value of the temporary variable is again reduced by four and the value saved at memory location M9 is loaded into register R16 (register S0).

Lastly, as indicated by pseudo-code 1100, the value in the stack pointer register (R29) is adjusted to deallocate the stack frame (e.g., the stack frame created using example instruction 402A).

Method 1100 will now be described with regard to instruction 975, register bank 156, stack 1800 (shown in FIG. 18), and pseudo-code 1200 (shown in FIGS. 12A and 12B) in order to point out differences between instruction 975 and instruction 902.

As will be understood by a person skilled in the relevant art given the description herein, steps 1002, 1004, 1006, and 1008 do not change when instruction 975 is used to encode method 1000 rather than instruction 902. Thus, the description for theses steps in not repeated here.

In step 1010, fields 908 and 910 of instruction 975 are encoded to indicate whether static registers R16 and R17 are to be restored before exit from a subroutine. In an embodiment, if bits 4 and 5 of instruction 975 are set, the static values on stack 1800 will be restored to registers R16 and R17. For example, if bit 4 of instruction 902 is set, a value at memory location M5 will be loaded into register R16. Similarly, if bit 5 of instruction 902 is set, a value at memory location M6 will be loaded into register R17.

In step 1012 of method 1000, a 4-bit binary value is encoded in argument registers field 960 (aregs) of instruction extension 952 to indicate which registers specified as argument registers in step 902 are to be restored as static registers during execution of instruction 975. FIG. 7 illustrates the 4-bit binary encoding used in an embodiment of the invention. Other encodings, however, can also be used in accordance with method 1000.

In step 1014, field 906 of instruction 975 is encoded to indicate whether a value on stack 1800 is to be loaded into return address register R31 before exit from a subroutine. In an embodiment, for example, a value stored at memory location M11 will be loaded into register R31 during execution of instruction 975 if bit 6 of instruction 975 is set. If bit 6 is cleared, no value is loaded into register R31 during execution of instruction 975.

In step 1016, none, one, two, three, or four of the argument registers R4, R5, R6, or R7 specified in step 1002 are restore during execution of instruction 975. Which, if any, argument registers are restored depends on the value encoded in field 960 of instruction 975. FIG. 7 shows which specified argument registers are restored as static registers for the 4-bit binary encoding illustrated in FIG. 7.

In step 1018, register R16 is either restored or not restored during execution of instruction 975. Whether register R16 is restored is based on the encoding of field 908. In an embodiment, register R16 is restored using a value from stack 1800 only if bit 5 of instruction 975 is set. Otherwise, register R16 is not restored when instruction 975 is executed. Similarly, in step 1018, register R17 is either restored or not restored during execution of instruction 975 based on the encoding of field 910. In an embodiment, register R17 is restored using a value from stack 1800 only if bit 4 of instruction 975 is set. If bit 4 is zero, register R17 is not restored when instruction 975 is executed.

In step 1020, register R31 is either restored or not restored during execution of instruction 975 based on the encoding of field 906. In an embodiment, register R31 is restored using a value from memory location M11 of stack 1800 only if bit 6 of instruction 975 is set. Otherwise, register R31 is not restored when instruction 975 is executed.

In step 1022, the value in register R29 is adjusted based on a value encoded in fields 958 and 912 of instruction 975. Adjusting the stack pointer value in register R29 allows stack memory to be deallocated before exit from a called subroutine. In an embodiment, the value in register R29 is adjusted by adding 8 times the frame-size value encoded in fields 958 and 912 of instruction 975. The 4-bits of field 958 and the 4-bits of field 912 are concatenated to form an 8-bit frame-size value. In other embodiments, the value in register R29 is adjusted by different amounts.

Field 956 of instruction 975 is used to encode whether additional registers of register bank 156 are restored as static registers before exit from a subroutine. For example, in an embodiment, registers R18, R19, R20, R21, R22, R23, and R30 can be restored as additional static registers. This feature of the invention is further described below with reference to pseudo-code 1200.

FIGS. 12A and 12B illustrate pseudo-code 1200 according to the invention. Pseudo-code 1200 describes to a person skilled in the relevant art how a processor according to the invention implements the steps of method 1000 encoded in an instruction 975.

The steps of pseudo-code 1200 will now be described. The steps of pseudo-code 1200 are described with reference to register bank 156, stack 1800, and example instruction 975A shown below and in FIG. 18. Example instruction 975A can be used to restore static values saved to the stack using example instruction 475A. As can be seen by examining the example instruction, the encodings of the instruction fields are: "1" for return address field 906; "1" for static register field 908; "1" for static register field 910; "00010100" (i.e., 20) for the concatenated frame-size fields 958 and 912; "100" for the additional static registers field 956; and "1010" for the argument registers field 960. The encodings for the restore instruction opcode field 904 and the extend instruction opcode field 954 are shown as "XXXXXXXXX" and "XXXXX," respectfully, to indicate that these encodings are processor specific values that are unimportant for understanding the steps of pseudo-code 1200.

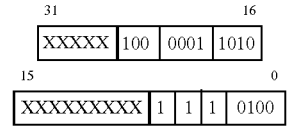

Implementation of pseudo-code 1200 starts by adjusting the value of register R29 (the stack pointer), based on a frame-size value encoded in fields 958 and 912, and saving the new value to two temporary variables. As indicated by pseudo-code 1200, the value in the stack pointer register (R29) is adjusted by shifting the concatenated frame-size value left three bits, padding the new value with zeros, and then adding the new value to the value in register R29. At the start of pseudo-code 1200, the stack pointer is assumed to be pointing at a memory location below memory location M0

(i.e, 64 bytes below memory location M0). The new value saved in the temporary variables points to memory location M12.

After storing the adjusted stack pointer value to a first and second temporary variable, the value of return address field 906 is examined. In the case of example instruction 975A, the encoded value is 1. Thus, the value of the first temporary variable is reduced by four and the value at memory location M11 (the return address) is loaded into register R31.

After restoring the return address, pseudo-code 1200 restores any extra static registers encoded in field 956 of instruction 975A. As described herein, the encoding "100" indicates that registers R21, R20, R19, and R18 are to be restored as extra static register. Thus, in an embodiment, the values stored at memory locations M10, M9, M8, and M7 are loaded into registers R21, R20, R19, and R18, respectfully.

Next, the value of static field 910 is examined. In the case of example instruction 975A, the encoded value is 1. Thus, the value of the first temporary variable is again reduced by four and the value saved at memory location M6 is loaded into register R17 (register S1). Similarly, the value of static field 908 is examined. In the case of example instruction 975A, the encoded value is 1. Thus, the value of the first temporary variable is again reduced by four and the value saved at memory location M5 is loaded into register R16 (register S0).

The next step of pseudo-code 1200 is to restore any argument register values saved on stack 1800 that are to be treated as static values in accordance with the encoding of field 960. From looking at either FIG. 7 or pseudo-code 1200, it can be determined that registers R6 and R7 are to be restored as statics registers. Accordingly, register R7 is restored with the value saved at memory location M4. Register R6 is restored with the value saved at memory location M3.

Lastly, as indicated by pseudo-code 1200, the value in the stack pointer register (R29) is adjusted by loading register R29 with the adjusted stack pointer value saved in the second temporary variable. It should be noted that registers R4 and R5 are not restored using the values stored at memory locations M13 and M12.

Based on the description of the invention herein, a person skilled in the relevant art will understand how to implement the invention to flexibly allocate which values contained in the registers of register bank 156 are saved as static or argument values upon entry to a subroutine, and which registers are restored as static registers before exit from a subroutine. A person skilled in the relevant art will understand based on the description herein how to implement the invention to flexibly allocate and deallocate stack memory according to the invention.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the invention.

In addition to implementations using hardware (e.g., within a microprocessor or microcontroller), implementations also may be embodied in software disposed, for example, in a computer usable (e.g., readable) medium configured to store the software (i.e., a computer readable program code). The program code causes the enablement of the functions or fabrication, or both, of the systems, techniques and operations disclosed herein. For example, this can be accomplished through the use of general programming languages (e.g., C or C++), hardware description languages (HDL) including Verilog HDL, VHDL, and so on, or other available programming and/or circuit (i.e., schematic) capture tools. The program code can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

It is understood that the functions accomplished and/or structure provided by the embodiments and techniques described above can be represented in a core (e.g., a microprocessor core) that is embodied in program code and may be transformed to hardware as part of the production of integrated circuits. Also, the system, techniques, and functionality may be embodied as a combination of hardware and software. Moreover, the save and restore functionality described herein may be carried out using a plurality of instructions that emulate such functionality. Thus, the present invention should not be limited by any of the above-described exemplary embodiments, but should be defined only in accordance with the following claims and their equivalents.

What is claimed is:

1. A method for encoding an instruction to restore processor core register values from stack memory and to de-allocate stack memory, comprising:
encoding in a first field of the instruction whether a first value in a first location in stack memory is to be restored to a first register, wherein the first location in stack memory is determined by the sum of a first address value and a stack pointer value; and
encoding in a frame size field of the instruction a second valve to adjust the stack pointer value.

2. The method of claim 1, further comprising:
encoding in a second field of the instruction whether a third value in a second location in stack memory is to be restored to a second register, wherein the second location in stack memory is determined by the sum of a second address value and the stack pointer value.

3. The method of claim 2, further comprising:
encoding in a third field of the instruction whether a fourth value in a third location in stack memory is to be restored to a third register, wherein the third location in stack memory is determined by the sum of a third address value and the stack pointer value; and
encoding in a fourth field of the instruction whether a fifth value in a fourth location in stack memory is to be restored to a fourth register, wherein the fourth location in stack memory is determined by the sum of a fourth address value and the stack pointer value.

4. The method of claim 1, further comprising:
encoding at least one least significant bit of the second value in a first 16-bit portion of the instruction; and
encoding at least one most significant bit of the second value in a second 16-bit portion of the instruction.

5. A method for restoring processor core register values from stack memory and de-allocating stack memory, comprising:
processing an instruction, using a processor core having a plurality of registers, wherein the instruction has been encoded by encoding in a first field of the instruction whether a first value in a first location in stack memory is to be restored to a first register, wherein the first location is stack memory is determined by the sum of a first address value and a stack pointer value, and by encoding in a frame size field of the instruction a second value to adjust the stack pointer value; and restoring the first value to the first register if based on the encoding in the first field of the instruction the first value is to be restored to the first register.

6. The method of claim 5, further comprising:

adjusting the stack pointer value based on the second value in the frame size field of the instruction.

7. A computer readable medium comprising a microprocessor core embodied in software, the microprocessor core comprising:

a plurality of registers;

means for decoding a first field of an instruction that encodes whether a first value in a first location in stack memory is to be restored to a first register, wherein the first location in stack memory is determined by the sum of a first address value and a stack pointer value; and means for decoding a frame size field of the instruction that encodes a second value to adjust the stack pointer value.

8. The computer readable medium of claim 7, wherein the microprocessor core further comprises:

means for decoding a second field of the instruction that encodes whether a third value in a second location in stack memory is to be restored to a second register, wherein the second location in stack memory is determined by the sum of a second address value and the stack pointer value.

9. The computer readable medium of claim 8, wherein the microprocessor core further comprises:

means for decoding a third field of the instruction that encodes whether a fourth value in a third location in stack memory is to be restored to a third register, wherein the third location in stack memory is determined by the sum of a third address value and the stack pointer value; and means for decoding a fourth field of the instruction that encodes whether a fifth value in a fourth location in stack memory is to be restored to a fourth register, wherein the fourth location in stack memory is determined by the sum of a fourth address value and the stack pointer value.

10. The computer readable medium of claim 7, wherein at least one least significant bit of the second value is in a first 16-bit portion of the instruction, and at least one most significant bit of the second value is in a second 16-bit portion of the instruction.

11. A computer readable medium comprising a microprocessor core embodied in software, the microprocessor core comprising:

a plurality of registers;

means for processing an instruction, wherein the instruction has been encoded by encoding in a first field of the instruction whether a first value in a first location in stack memory is to be restored to a first register, wherein the first location in stack memory is determined by the sum of a first address value and a stack pointer value, and by encoding in a second field of the instruction a second value to be used to adjust the stack pointer value; and means for restoring the first value to the first register if based on the encoding in the first field of the instruction the first value is to be restored to the first register.

12. The computer readable medium of claim 11, wherein the microprocessor core further comprises:

means for adjusting the stack pointer value based on the second value in the second field of the instruction.

13. A processor, comprising:

a plurality of registers; and a decoder that decodes a first field of an instruction that encodes whether a first value in a first location in stack memory is to be restored to a first register, wherein the first location in stack memory is determined by the sum of a first address value and a stack pointer value, and that decodes a frame size field of the instruction that encodes a second value to be used to adjust the stack pointer value.

14. The processor of claim 13, wherein the decoder decodes a second field of the instruction that encodes whether a third value in a second location in stack memory is to be restored to a second register, wherein the second location in stack memory is determined by the sum of a second address value and the stack pointer value.

15. The processor of claim 14, wherein the decoder decodes a third field of the instruction that encodes whether a fourth value in a third location in stack memory is to be restored to a third register, wherein the third location in stack memory is determined by the sum of a third address value and the stack pointer value, and decodes a fourth field of the instruction that encodes whether a fifth value in a fourth location in stack memory is to be restored to a fourth register, wherein the fourth location in stack memory is determined by the sum of a third address value and the stack pointer value.

16. The processor of claim 13, wherein at least one least significant bit of the second value is in a first 16-bit portion of the instruction, and at least one most significant bit of the second value is in a second 16-bit portion of the instruction.

17. A system, comprising:

a memory; and a processor, coupled to the memory, wherein the processor includes a plurality of registers; and a decoder that decodes an instruction that has been encoded by encoding in a first field of the instruction whether a first value in a first location in stack memory is to be restored to a first register, wherein the first location in stack memory is determined by the sum of a first address value and a stack pointer value, and by encoding in a second field of the instruction a second value to be used to adjust the stack pointer value.

18. The system of claim 17, further comprising:

means for adjusting the stack pointer value based on the second value in the second field of the instruction.

19. A system, comprising:

a memory; and a processor coupled to the memory, that services an instruction that has been encoded by encoding in a first field of the instruction whether a first value in a first location in stack memory is to be restored to a first register of the processor, wherein the first location in stack memory is determined by the sum of a first address value and a stack pointer value, and by encoding in a second field of the instruction a value to be used to adjust the stack pointer value.

20. A method for restoring processor core register values from stack memory and de-allocating stack memory, comprising:
- encoding in a static register field of the instruction whether a plurality of values are to be restored to a plurality of registers from corresponding locations in stack memory, wherein a location in stack memory is determined by the sum of an address value and a stack pointer value; and
- encoding in a frame size field of the instruction an offset value to adjust the stack pointer value.

21. The method of claim 20, further comprising:
- restoring corresponding value to the plurality of registers if based on the encoding in the static register field of the instruction the values are to be restored to the plurality of registers.

22. The method of claim 20, further comprising:
- adjusting the stack pointer value based on the offset value in the frame size field of the instruction and thereby de-allocating a portion of stack memory.

* * * * *

UNITED STATES PATENT AND TRADEMARK OFFICE
CERTIFICATE OF CORRECTION

PATENT NO. : 7,281,123 B2  Page 1 of 1
APPLICATION NO. : 10/994827
DATED : October 9, 2007
INVENTOR(S) : Kissell et al.

It is certified that error appears in the above-identified patent and that said Letters Patent is hereby corrected as shown below:

Title Page
In item (75), Inventors, "(FR)" is replaced with --(US)--.

Column 18
In line 40, "valve" is replaced with --value--.

Signed and Sealed this

Sixth Day of May, 2008

JON W. DUDAS
*Director of the United States Patent and Trademark Office*